United States Patent
Lee et al.

(10) Patent No.: US 12,231,192 B2
(45) Date of Patent: Feb. 18, 2025

(54) RIC FOR SELECTING CELL TO PERFORM COMP FUNCTION AND METHOD OF OPERATING THE SAME

(71) Applicant: SAMSUNG ELECTRONICS CO., LTD., Suwon-si (KR)

(72) Inventors: Deokhui Lee, Suwon-si (KR); Myounghwan Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/976,025

(22) Filed: Oct. 28, 2022

(65) Prior Publication Data

US 2023/0139233 A1 May 4, 2023

Related U.S. Application Data

(63) Continuation of application No. PCT/KR2022/016474, filed on Oct. 26, 2022.

(30) Foreign Application Priority Data

Oct. 29, 2021 (KR) .................. 10-2021-0147355
Mar. 11, 2022 (KR) .................. 10-2022-0031048

(51) Int. Cl.
*H04K 1/10* (2006.01)
*H04B 7/0456* (2017.01)
(Continued)

(52) U.S. Cl.
CPC ...... *H04B 7/0456* (2013.01); *H04W 72/0446* (2013.01); *H04W 72/23* (2023.01)

(58) Field of Classification Search
CPC ............ H04B 7/0456; H04W 72/0446; H04W 72/23; H04W 16/28; H04W 36/0094
(Continued)

(56) References Cited

U.S. PATENT DOCUMENTS

2011/0124345 A1  5/2011  Lee et al.
2013/0053077 A1  2/2013  Barbieri et al.
(Continued)

FOREIGN PATENT DOCUMENTS

KR  10-2011-0057464  6/2011
KR  10-2020-0082646  7/2020
(Continued)

OTHER PUBLICATIONS

Search Report and Written Opinion dated Feb. 2, 2023 issued in International Patent Application No. PCT/KR2022/016474.
(Continued)

*Primary Examiner* — Phuong Phu
(74) *Attorney, Agent, or Firm* — NIXON & VANDERHYE P.C.

(57) ABSTRACT

According to various embodiments, a method of operating a network may include transmitting to a first user equipment (UE) connected to the network, at least one transmission signal for downlink traffic corresponding to the first UE based on a first direction, transmitting a plurality of synchronization signal blocks (SSBs) configured by the network, based on a plurality of directions corresponding respectively to the plurality of SSBs, and identifying a degree of overlap between each of the plurality of directions corresponding respectively to the plurality of SSBs and the first direction.

15 Claims, 17 Drawing Sheets

(51) Int. Cl.
 *H04L 27/28* (2006.01)
 *H04W 72/0446* (2023.01)
 *H04W 72/23* (2023.01)

(58) Field of Classification Search
 USPC ............... 375/260, 295, 285, 346, 219, 220
 See application file for complete search history.

(56) References Cited

U.S. PATENT DOCUMENTS

| | | |
|---|---|---|
| 2014/0219115 A1 | 8/2014 | Etemad et al. |
| 2019/0140881 A1 | 5/2019 | Akkarakaran et al. |
| 2019/0373627 A1 | 12/2019 | Luo et al. |
| 2020/0213993 A1 | 7/2020 | Liu et al. |
| 2020/0413449 A1* | 12/2020 | Yerramalli ............ H04W 16/28 |
| 2021/0144042 A1 | 5/2021 | Akkarakaran et al. |
| 2021/0152218 A1 | 5/2021 | Cao |
| 2021/0297135 A1 | 9/2021 | Kim et al. |
| 2021/0337398 A1 | 10/2021 | Kumar et al. |
| 2022/0070800 A1 | 3/2022 | Woo et al. |
| 2022/0210708 A1* | 6/2022 | Parekh .............. H04W 36/0094 |
| 2023/0133415 A1 | 5/2023 | Mu |

FOREIGN PATENT DOCUMENTS

| | | |
|---|---|---|
| WO | 2019/066575 | 4/2019 |
| WO | 2020/160781 | 8/2020 |
| WO | 2021/162959 | 8/2021 |
| WO | 2021/179314 | 9/2021 |

OTHER PUBLICATIONS

Extended European Search Report for EP Application No. 22887606.6 dated Nov. 22, 2024, 11 pages.

\* cited by examiner

RIC FOR SELECTING CELL TO PERFORM COMP FUNCTION AND METHOD OF OPERATING THE SAME

CROSS-REFERENCE TO RELATED APPLICATIONS

This application is a continuation of International Application No. PCT/KR2022/016474 designating the United States, filed on Oct. 26, 2022, in the Korean Intellectual Property Receiving Office and claiming priority to Korean Patent Application No. 10-2021-0147355, filed on Oct. 29, 2021, in the Korean Intellectual Property Office and to Korean Patent Application No. 10-2022-0031048, filed on Mar. 11, 2022, in the Korean Intellectual Property Office, the disclosures of all of which are incorporated by reference herein in their entireties.

BACKGROUND

Field

The disclosure relates to a radio access network (RAN) intelligent controller (RIC) for selecting a cell to perform a coordinated multi-point (CoMP) function, and a method of operating the same.

Description of Related Art

In a wireless communication network, multiple cells or base stations (BS) (also referred to as "evolved Node Bs (eNBs)" or "next generation Node Bs (gNBs)") may use frequency bands and standardized codebooks to precode transmissions to their respective user equipments (UEs) through multiple transmission antennas. However, when the multiple cells or BSs transmit signals to their target UEs, interference may occur. This interference may be referred to as "inter-cell interference". The inter-cell interference may limit the throughput of the wireless network.

To cancel inter-cell interference, coordinated multi-point (CoMP) transmission technology has been provided. In the CoMP transmission technology, one UE communicates with multiple BSs to increase a throughput at a cell edge or an overall system throughput. Various types of CoMP functions (e.g., joint transmission (JT), dynamic point selection (DPS), coordinated scheduling (CS), coordinated beamforming (CB)) may be provided by the CoMP transmission technology. A radio access network (RAN) intelligent controller (RIC) based on a BS or an open RAN (O-RAN) may select a cell to perform a CoMP function, for example, a cooperative cell.

A legacy BS is implemented such that a data processing unit (DU) and a radio transceiver (radio unit or remote unit (RU)) of the BS are installed together in a cell site. However, such an integrated implementation has physical limitations. For example, as service subscribers or traffic increases, an operator should deploy new BSs in the cell site. To overcome this problem, a centralized RAN (C-RAN) or cloud RAN structure has been implemented. The C-RAN may have a structure in which DUs are disposed at one physical location and RUs are disposed in a cell site that transmits/receives radio signals to/from an actual UE. A DU and an RU may be connected by an optical or coaxial cable. As the RU and the DU are separated, an interface standard for communication between them is required, and standards such as common public radio interface (CPRI) are used between the RU and the DU. The 3$^{rd}$ generation partnership project (3GPP) is working on standardization of a BS structure, and discussion is underway on an open network standard, O-RAN applicable to a 5$^{th}$ generation (5G) system. The O-RAN defines an RU, a DU, a central unit-control plane (CU-CP), a central unit-user plane (CU-UP) which are legacy 3GPP network elements (NEs) as an open RU (O-RU), an open DU (O-DU), an open CU-CP (O-CU-CP), and an open CU-UP (O-CU-UP), respectively (these elements may be collectively referred to an O-RAN BS), and further proposes an RIC and a non-real-time RIC (NRT-RIC).

To select a cell to perform a coordinated multi-point (CoMP) function, for example, a cooperative cell, the reception strength of a signal from a neighbor cell, measured by a user equipment (UE) may be used. For example, as the UE-measured reception strength increases, the signal from the neighbor cell may have a high possibility of interfering with the UE. The UE may measure, for example, a synchronized signal block (SSB) from the neighbor cell. The neighbor cell may transmit the SSB in various beamforming directions, for example, by beam-sweeping. The neighbor cell may transmit a transmission signal for downlink traffic to another UE connected to the neighbor cell in a specific beamforming direction. Even though the SSB from a first beamforming direction from the neighbor cell is measured as having a relatively large reception strength at the UE, the neighbor cell may transmit a transmission signal for downlink traffic to the UE connected to the neighbor cell in a second beamforming direction relatively very different from the first beamforming direction. When a cell to perform the CoMP function is selected only based on the reception strengths of SSBs from neighbor cells, there is a possibility that a cell that does not substantially cause interference is selected as a cell to perform the CoMP function.

SUMMARY

Embodiments of the disclosure provide a RIC and a method of operating the RIC that selects a cell to perform a CoMP function for a specific UE in consideration of the transmission direction (or beamforming direction) of a transmission signal for downlink traffic from a neighbor cell as well as the reception strength of an SSB from the neighbor cell at the specific UE.

According to various example embodiments, a method of operating a network may include, transmitting at least one transmission signal for downlink traffic corresponding to a first user equipment (UE) connected to the network to the first UE based on a first direction, transmitting a plurality of synchronization signal blocks (SSBs) configured by the network based on a plurality of directions corresponding respectively to the plurality of SSBs, and identifying a degree of overlap between each of the plurality of directions corresponding respectively to the plurality of SSBs and the first direction.

According to various example embodiments, a base station (BS) may include, a radio frequency (RF) device, and a processor. The processor may be configured to control the RF device to transmit at least one transmission signal for downlink traffic corresponding to a first user equipment (UE) connected to the BS to the first UE based on a first direction, control the RF device to transmit a plurality of synchronization signal blocks (SSBs) configured by the BS based on a plurality of directions corresponding respectively to the plurality of SSBs, and identify a degree of overlap between each of the plurality of directions corresponding respectively to the plurality of SSBs and the first direction.

According to various example embodiments, a method of operating a network may include, obtaining, from a first cell among a plurality of cells, information about reception strengths of a plurality of SSBs from at least some of the plurality of cells, measured by a first user equipment (UE) connected to the first cell, obtaining degrees of overlap between a first beamforming direction of a transmission signal for downlink traffic corresponding to a UE connected to each of the plurality of cells and a plurality of second beamforming directions of a plurality of synchronization signal blocks (SSBs) from the cell, and determining at least one cell to perform a coordinated multi-point (CoMP) function for the first UE from among the plurality of cells based on the information about the reception strengths and the degrees of overlap.

According to various example embodiments, an RIC and a method of operating the RIC may be provided, which select a cell to perform a coordinated multi-point (CoMP) function for a specific UE in consideration of the transmission direction (or beamforming direction) of a transmission signal for downlink traffic from a neighbor cell as well as the reception strength of an SSB from the neighbor cell at the specific UE. Accordingly, the possibility of selecting a cell that may actually cause interference as a cell to perform the CoMP function may be increased.

DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
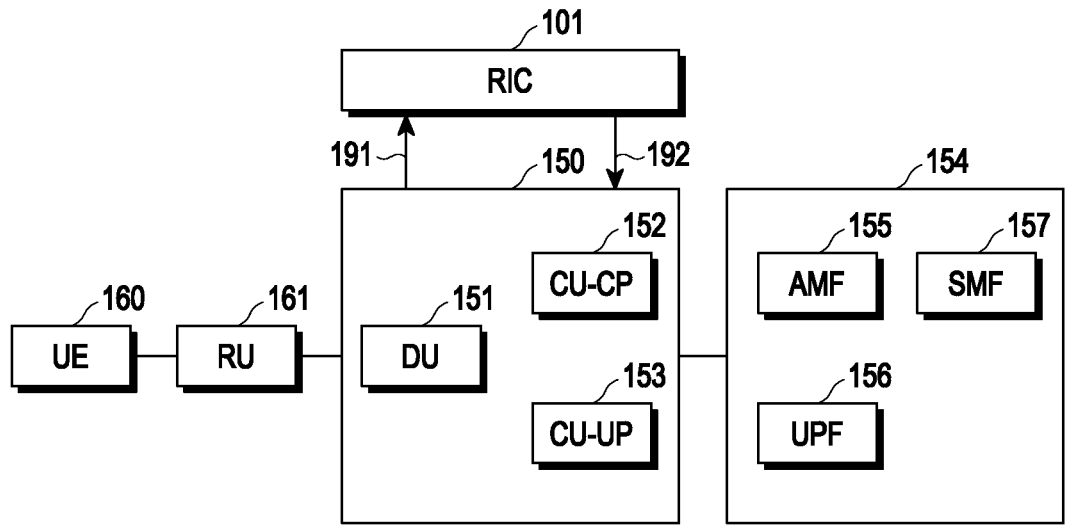
FIG. 1A is a block diagram illustrating an example configuration of a radio access network (RAN) intelligent controller (RIC), a RAN, and a core network (CN) according to various embodiments.

FIG. 1A is an example configuration of a block diagram illustrating a radio access network (RAN) intelligent controller (RIC), a RAN, and a core network (CN) according to various embodiments.

According to various embodiments, a RAN 150 may include at least one distributed unit (DU) 151, at least one central unit-control plane (CU-CP) 152, or at least one central unit-user plane (CU-UP) 153. Although the RAN 150 is shown as connected to at least one remote unit (or radio unit) (RU) 161, this is simply an example, and the at least one RU 161 may be connected to the RAN 150 or included in the RAN 150. The RAN 150 may be an open RAN (O-RAN). In this case, the DU 151 may be an open DU (O-DU), the CU-CP 152 may be an open CU-CP (O-CU-CP), the CU-UP 153 may be an open CU-UP (O-CU-UP), and the RU 161 may be an open RU (O-RU).

According to various embodiments, the RU 161 may perform communication with a user equipment (UE) 160. The RU 161 may be a logical node that provides low-physical layer (PHY) functions and radio frequency (RF) processing. The DU 151 may be a logical node that provides the functionalities of the radio link control (RLC) layer, the medium access control (MAC) layer, and the high-PHY layer, and connected to, for example, the RU 161. The CUs 152 and 153 may be logical nodes that provide the functionalities of the radio resource control (RRC) layer, the service data adaptation protocol (SDAP) layer, and the packet data convergence protocol (PDCP) layer. The CU-CP 152 may be a logical node that provides the functionalities of the control-plane parts of the RRC layer and the PDCP layer. The CU-UP 153 may be a logical node that provides the functionalities of the user-plane parts of the SDAP layer and the PDCP layer.

According to various embodiments, a core network (e.g., 5$^{th}$ generation core (5GC)) 154 may include at least one of an access and mobility management function (AMF) 155, a user plane function (UPF) 156, or a session management function (SMF) 157. The AMF 155 may provide a function of access and mobility management on a UE basis. The SMF 156 may provide a session management function. The UPF 156 may transmit downlink (DL) data received from a data network to the UE 160 or transmit uplink (UL) data received from the UE 160 to the data network. For example, the CU-CP 152 may be connected to the AMF 155 via an N2 interface (or an NG application protocol (NGAP) interface). The AMF 155 may be connected to the SMF 157 via an N11 interface. The CU-UP 153 may be connected to the UPF 153 via an N3 interface.

According to various embodiments, an RIC 101 may customize RAN functionalities for service or regional resource optimization. The RIC 101 may provide at least one function of network intelligence (e.g., policy enforcement and handover optimization), resource assurance (e.g., radio link management), advanced self-organized-network (SON), or resource control (e.g., load balancing or slicing policy), and functions (or operations) related to the RAN 150 that the RIC 101 is capable of providing (or performing) are not limited.

According to various embodiments, the RIC 101 may transmit and/or receive E2 messages 191 and 192 to and/or from the RAN 150. For example, the RIC 101 may be connected to the DU 151 via an E2-DU interface. For example, the RIC 101 may be connected to the CU-CP 152 via an E2-CP interface. For example, the RIC 101 may be connected to the CU-UP 153 via an E2-UP interface. At least one interface between the RIC 101 and the RAN 150 may be referred to as an E2 interface. While the RIC 101 and the RAN 150 are shown as separate devices, this is simply an example. The RIC 101 and the RAN 150 may be implemented as separate devices or one device.

According to various embodiments, the RIC 101 may transmit and/or receive the E2 messages 191 and 192 to and/or from an E2 node (e.g., at least one of the DU 151, the CU-CP 152, or the CU-UP 153). The E2 node may include (or provide) an E2 node function. The E2 node function may be configured based on a specific xAPP (application software) installed in the RIC 101. When a key performance indicator (KPI) monitor function is provided, KPI monitor collection software may be installed in the RIC 101. The E2 node may generate KPI parameters, and include an E2 node function that transmits the E2 message 191 including the KPI parameters to an E2 termination function located in the RIC 101. The E2 termination function located in the RIC 101 is the termination of the RIC 101 for the E2 message. After interpreting the E2 message received from the E2 node, the E2 termination function may transmit the E2 message to the xAPP. The RIC 101 may provide information related to an operation of the RAN 150 to the RAN 150 in the E2 message 192. The RIC 101 may deploy the xAPP, and the xAPP deployed in the RIC 101 may subscribe to an E2 node. The xAPP may receive an E2 message periodically or aperiodically from the subscribed E2 node.

Figure 1B:
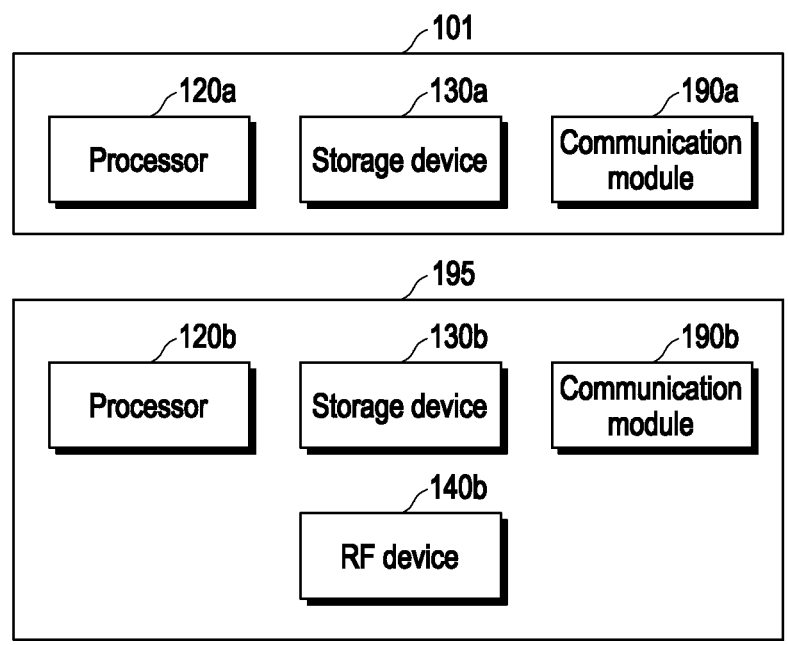
FIG. 1B is a block diagram illustrating a hardware configuration of an RIC according to various embodiments.

FIG. 1B is a block diagram illustrating a hardware configuration of an RIC according to various embodiments.

According to various embodiments, the RIC 101 (or an electronic device configured to perform the functions of the RIC 101) may include at least one of a processor (e.g., including processing circuitry) 120a, a storage device 130a, and/or a communication module (e.g., including communication circuitry) 190a. According to various embodiments, a gNB 195 may include at least one of a processor (e.g., including processing circuitry) 120b, a storage device 130b, a radio frequency (RF) device (e.g., including RF circuitry) 140b, and/or a communication module (e.g., including communication circuitry) 190b. The gNB 195 may perform an operation of at least one of, for example, the RU 161, the DU 151, the CU-CP 152, or the CU-UP 153.

According to various embodiments, the processor 120a and/or the processor 120b may, for example, control at least one other component (e.g., a hardware or software component) of the RIC 101 (or an electronic device configured to perform the functions of the RIC 101) and/or the gNB 195 connected to the processor 120a and/or the processor 120b by executing, for example, software (e.g., a program), and perform various data processes or operations. The software may include, but not limited to, an xAPP, for example. According to an embodiment, as at least some of the data processes or the operations, the processor 120a and/or the processor 120b may store a command or data received from another component in the storage device 130a and/or the storage device 130b, process the command or data stored in the storage device 130a and/or the storage device 130b, and store result data in the storage device 130a and/or the storage device 130b. According to an embodiment, the processor 120a and/or the processor 120b may include at least some of a central processing unit (CPU), an application processor, a neural processing unit (NPU), or a communication processor. However, the type of the processor 120a and/or the processor 120b is not limited. The NPU may include a hardware structure specialized for processing an artificial intelligence model. The artificial intelligence model may include, but not limited to, machine learning (e.g., reinforcement learning, supervised learning, unsupervised learning, or semi-supervised learning). The artificial intelligence model may include a plurality of artificial neural network layers. An artificial neural network may be one or a combination of two or more of, but not limited to, a deep neural network (DNN), a convolutional neural network (CNN), a recurrent neural network (RNN), a restricted boltzmann machine (RBM), a deep belief network (DBN), a bidirectional recurrent deep neural network (BRDNN), and a deep Q-network. Additionally or alternatively to the hardware structure, the artificial intelligence model may include a software structure. It will be understood by those skilled in the art that as far as it is capable of storing data, like a disk (e.g., a hard disk drive (HDD)), any device may be used as the storage device 130a. According to various embodiments, the storage device 130a and/or the storage device 130b may store various data used by at least one component (e.g., the processor 120a and/or the processor 120b or the communication module 190a and/or the communication module 190b) of the RIC 101 (or an electronic device configured to execute the functions of the RIC 101) and/or the gNB 195. The data may include, for example, software and input data or output data for instructions related to the software.

According to various embodiments, the communication module 190a and/or the communication module 190b may include various communication circuitry and support establishment of a direct (e.g., wired) communication channel or a wireless communication channel and communication through the established communication channel between the RIC 101 (or an electronic device configured to perform the functions of the RIC 101) and the gNB 195. The type of the communication module 190a and/or the communication module 190b is not limited, as long as it is capable of supporting an E2 interface, for example.

According to various embodiments, the RF device 140b may include various RF circuitry including, for example, at least one radio frequency integrated circuit (RFIC), at least one radio frequency front end (RFFE), or at least one antenna to transmit and receive RF signals to and from a UE connected to the gNB 195.

Figure 2A:
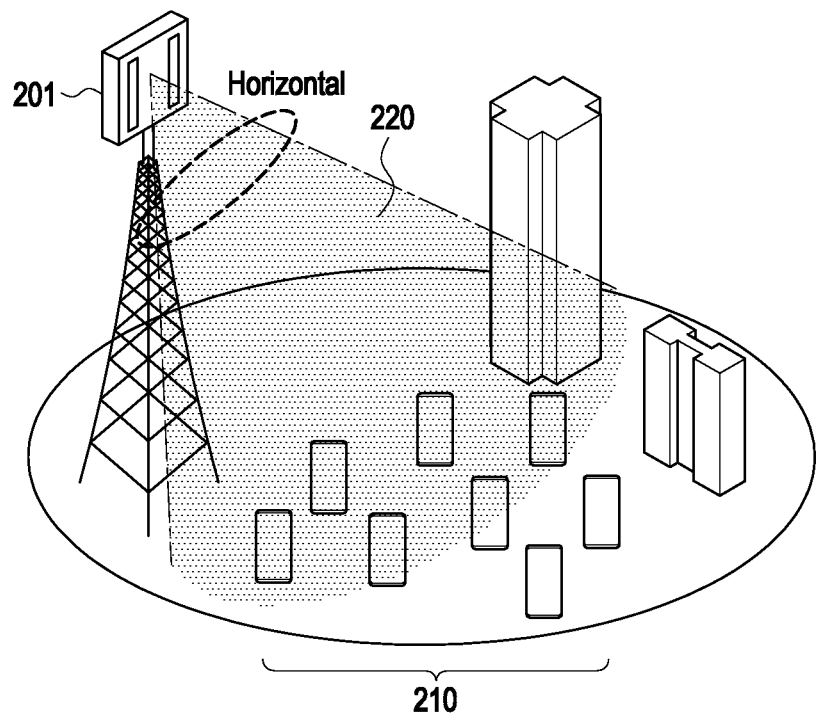
FIG. 2A is a diagram illustrating an example common beam according to a comparative example for comparison with various embodiments.
Figure 2B:
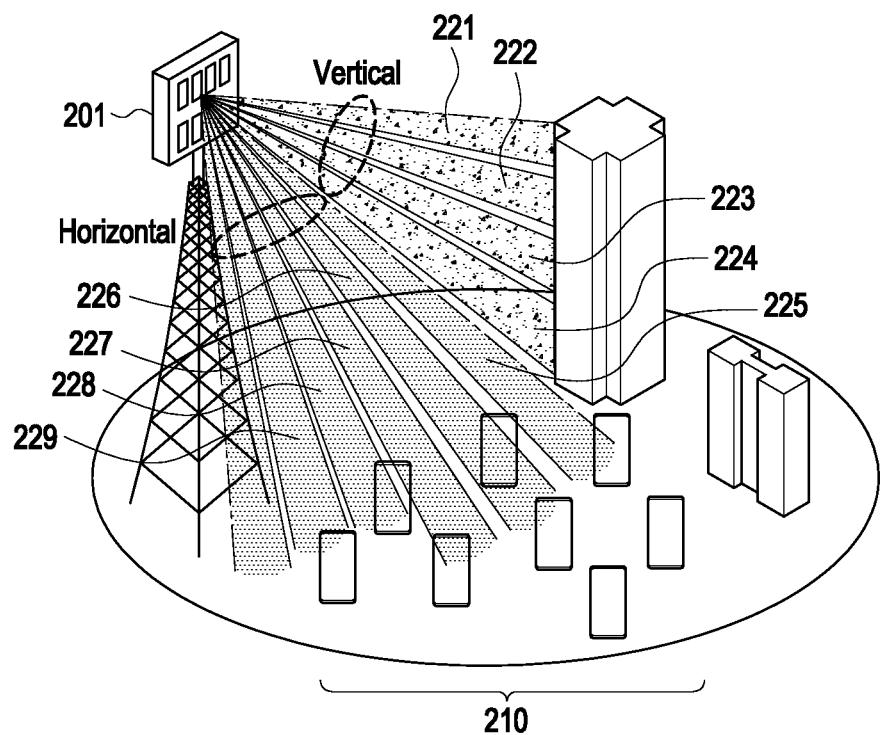
FIG. 2B is a diagram illustrating example beamformed beams according to various embodiments.

FIG. 2A is a diagram illustrating a common beam according to a comparative example for comparison with various embodiments. FIG. 2B is a diagram illustrating beamformed beams according to various embodiments. Those skilled in the art will understand that at least some of operations performed in the comparative example may also be performed in various embodiments.

As illustrated in FIG. 2A, a gNB 201 (or RU) according to the comparative example may provide an SSB or a channel state information-reference signal (CSI-RS) through a common beam 220. At least one UE 210 may measure the reception strength (e.g., reference signal received power (RSRP), reference signal received quality (RSRQ), signal-to-interference and noise ratio (SINR), received signal strength indicator (RSSI), and/or signal-to-noise ratio (SNR)) of the SSB or the CSI-RS based on the common beam 220. The reception strength of the SSB may be reported to a serving cell (not shown) to which the at least one UE 210 is connected. For example, when identifying that the reception strength of the SSB satisfies an A3 event, the at least one UE 210 may transmit a measurement report (MR) to the serving cell. Alternatively, the at least one UE 210 may report channel state information (CSI) (e.g., at least one of a rank indicator (RI), a precoder matrix indicator (PMI), or a channel quality indicator (CQI)) identified based on the CSI-RS to the gNB 201. However, even though a transmission signal for DL traffic is transmitted by beam-forming, the use of the common beam 220 may make it difficult to accurately identify the degree of interference from the gNB 201 just with the reception strength of the common beam 220. Accordingly, the SSB or the CSI-RS may be transmitted based on beamformed beams 221, 222, 223, 224, 225, 226, 227, 228, and 229, as illustrated in FIG. 2B. The beamformed beams 221, 222, 223, 224, 225, 226, 227, 228, and 229 may be formed based on different beamforming directions and/or different polarizations. For example, when the difference between the beamforming direction of an SSB and the beamforming direction of a transmission signal for actual DL traffic is relatively large, the degree of interference from the gNB 201 may be relatively small, which will be described with reference to FIGS. 3, 4 and 5.

Figure 3:
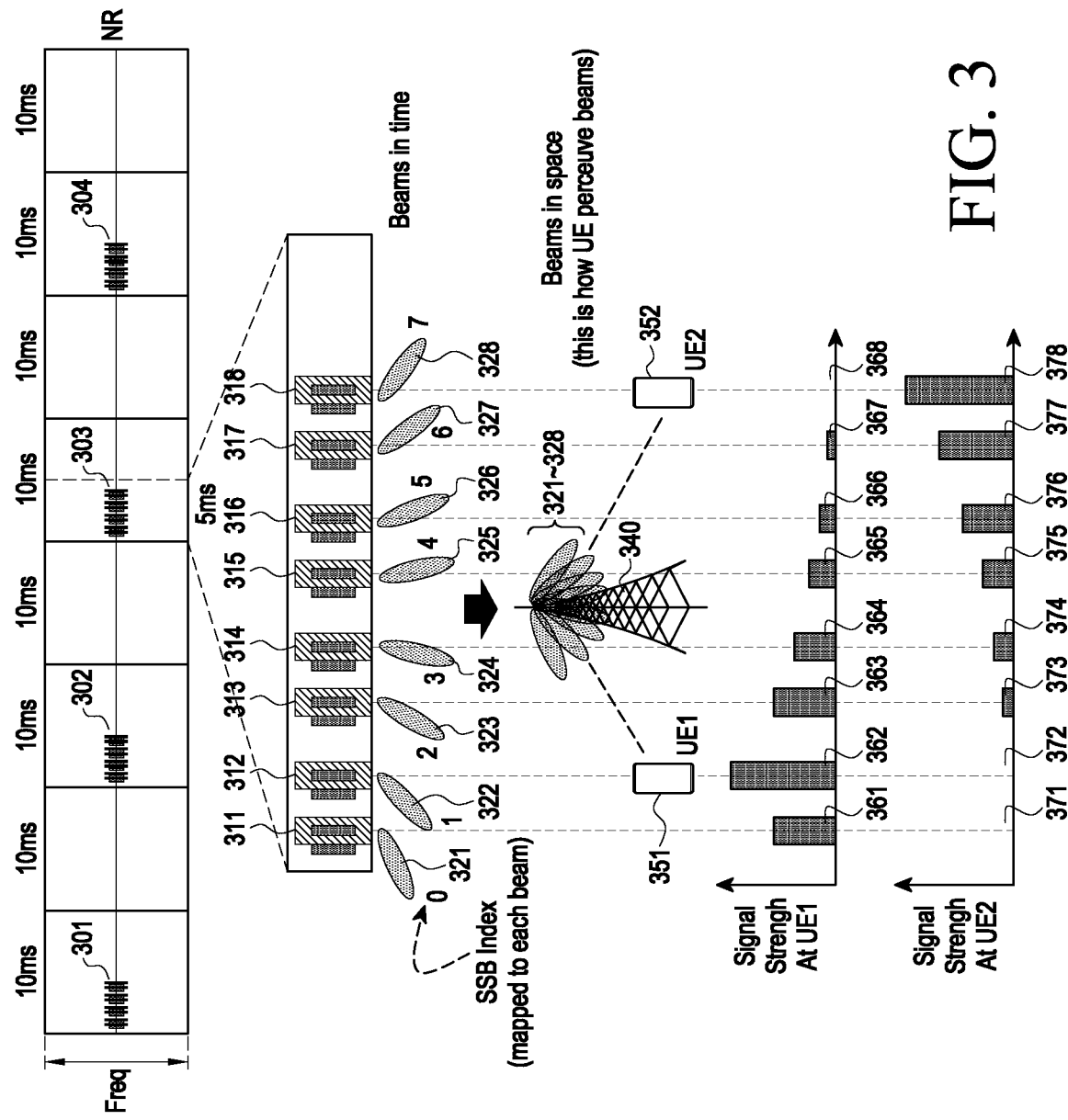
FIG. 3 is a diagram illustrating example reception strengths of a plurality of synchronization signal blocks (SSBs) from a next generation Node B (gNB) according to various embodiments.

FIG. 3 is a diagram illustrating example reception strengths of a plurality of SSBs from a gNB according to various embodiments.

According to various embodiments, a gNB 340 (e.g., RU) may periodically transmit SSB bursts 301, 302, 303, and 304. The SSB burst 303 may include a plurality of SSBs 311, 312, 313, 314, 315, 316, 317, and 318. The plurality of SSBs 311, 312, 313, 314, 315, 316, 317, and 318 may be formed as different beams 321, 322, 323, 324, 325, 326, 327, and 328, respectively. The different beams 321, 322, 323, 324, 325, 326, 327, and 328 may be formed in different beamforming directions. It is assumed that a first UE 351 and a second UE 352 are located around the gNB 340. The first UE 351 may measure reception strengths 361, 362, 363, 364, 365, 366, 367, and 368 corresponding to the plurality of SSBs 311, 312, 313, 314, 315, 316, 317, and 318. The reception strengths 361, 362, 363, 364, 365, 366, 367, and 368 corresponding to the plurality of respective SSBs 311, 312, 313, 314, 315, 316, 317, and 318 at the first UE 351 may be different. For example, the reception strength 362 corresponding to a second SSB 312 may be the largest. This may be because the position of the first UE 351 corresponds to the beamforming direction of the beam 322 corresponding to the second SSB 312. The second UE 352 may measure reception strengths 371, 372, 373, 374, 375, 376, 377, and 378 corresponding to the plurality of respective SSBs 311, 312, 313, 314, 315, 316, 317, and 318. The reception strengths 371, 372, 373, 374, 375, 376, 377, and 378 corresponding to the plurality of respective SSBs 311, 312, 313, 314, 315, 316, 317, and 318 at the second UE 352 may be different. For example, the reception strength 378 corresponding to the eighth SSB 318 may be the largest. This may be because the position of the second UE 352 corresponds to the beamforming direction of the beam 328 corresponding to an eighth SSB 318.

A relatively large reception strength of an SSB from a neighbor cell may indicate that the SSB is highly likely to interfere with a UE. The RIC 101 (or an electronic device configured to perform the functions of the RIC 101) according to various embodiments may select a neighbor cell to perform a CoMP function, using the reception strength of an SSB measured at a UE as a factor. The RIC 101 according to various embodiments may consider the beamforming direction of a transmission signal for DL traffic actually formed in the neighbor cell, in addition to the reception strength of the SSB from the neighbor cell, which will be described in greater detail below with reference to FIGS. 4, 5 and 6.

Figure 4:
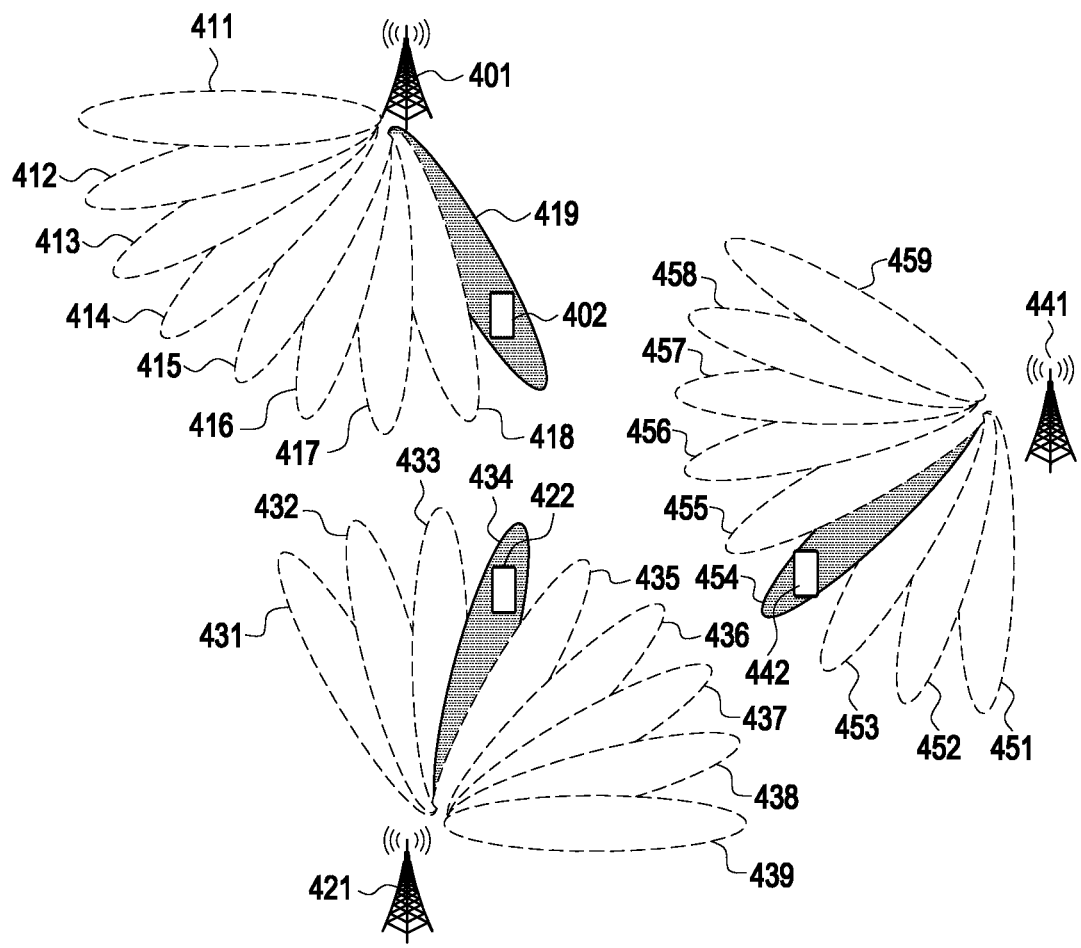
FIG. 4 is a diagram illustrating example transmission signals for a plurality of downlink traffics from gNBs according to various embodiments.

FIG. 4 is a diagram illustrating example transmission signals for a plurality of DL traffics from gNBs according to various embodiments.

According to various embodiments, a first UE 402 may be connected to a first gNB 401 (or RU). The first gNB 401 may transmit a transmission signal for DL traffic to the first UE 402 in the beamforming direction of at least one of a plurality of beams 411, 412, 413, 414, 415, 416, 417, 418, and 419, for example, the beam 419. The beamforming direction of the beam 419 may be set, for example, based on the reception strength and/or CSI of an SSB previously reported to the first gNB 401 by the first UE 402, which should not be construed as limiting. A second UE 422 may be connected to a second gNB 421 (or RU). The second gNB 421 may transmit a transmission signal for DL traffic to the second UE 422 in the beamforming direction of at least one of a plurality of beams 431, 432, 433, 434, 435, 436, 437, 438, and 439, for example, the beam 434. The beamforming direction of the beam 434 may be set, for example, based on the reception strength and/or CSI of an SSB previously reported to the second gNB 421 by the second UE 422, which should not be construed as limiting. A third UE 442 may be connected to a third gNB 441 (or RU). The third gNB 441 may transmit a transmission signal for DL traffic to the third UE 442 in the beamforming direction of at least one of a plurality of beams 451, 452, 453, 454, 455, 456, 457, 458, and 459, for example, the beam 454. The beamforming direction of the beam 454 may be set, for example, based on the reception strength and/or CSI of an SSB previously reported to the third gNB 441 by the third UE 442, which should not be construed as limiting.

When the UEs 402, 422, and 442 are located as illustrated in FIG. 4, their respective neighbor gNBs may interfere with the UEs 402, 422, and 442 to different degrees. For example, a transmission signal for DL traffic from the second gNB 421 may be relatively highly likely to cause interference to the first UE 402. This may be because the beamforming direction of the beam 434 corresponding to the transmission signal for the DL traffic from the second gNB 421 substantially corresponds to the physical position of the first UE 402. Similarly, the transmission signal for the DL traffic from the first gNB 401 may be relatively highly likely to cause interference to the second UE 422. This may be because the beamforming direction of the beam 419 corresponding to the transmission signal for the DL traffic from the first gNB 401 substantially corresponds to the physical position of the second UE 422.

The transmission signal for the DL traffic from the second gNB 421 may cause interference to the third UE 442 with a relatively low possibility. This may be because the beamforming direction of the beam 434 corresponding to the transmission signal for the DL traffic from the second gNB 421 does not substantially correspond to the physical position of the third UE 442. Likewise, the possibility that the transmission signal for the DL traffic from the third gNB 441 causes interference to the second UE 422 may be relatively low. This may be because the beamforming direction of the beam 454 corresponding to the transmission signal for the DL traffic from the third gNB 441 does substantially correspond to the physical position of the second UE 422.

In this case, for example, when a cell to perform beam nulling among CoMP functions with the second gNB 421 is selected, selection of a cell corresponding to the first gNB 401 may be preferred to selection of a cell corresponding to the third gNB 441. There is a low possibility that the beamforming direction of the beam 454 of the transmission signal for the DL traffic formed by the third gNB 441 affects the second UE 422, and thus the third gNB 441 is unlikely to interfere with the second UE 422. Accordingly, the RIC 101 according to various embodiments may select a cell to perform a CoMP function by further considering the beamforming direction of a transmission signal for DL traffic from a neighbor cell. A cell to perform a CoMP function may be called, for example, a helping cell. For example, when the reception strength of an SSB from a neighbor cell is relatively large, and the beamforming direction of a transmission signal for actually formed DL traffic from the neighbor cell is substantially the same as (or overlaps by more than a certain level) the beamforming direction of the SSB, the RIC 101 may select the neighbor cell as a cell to perform a CoMP function, which will be described in greater detail below with reference to FIGS. 5 and 6.

Figure 5:
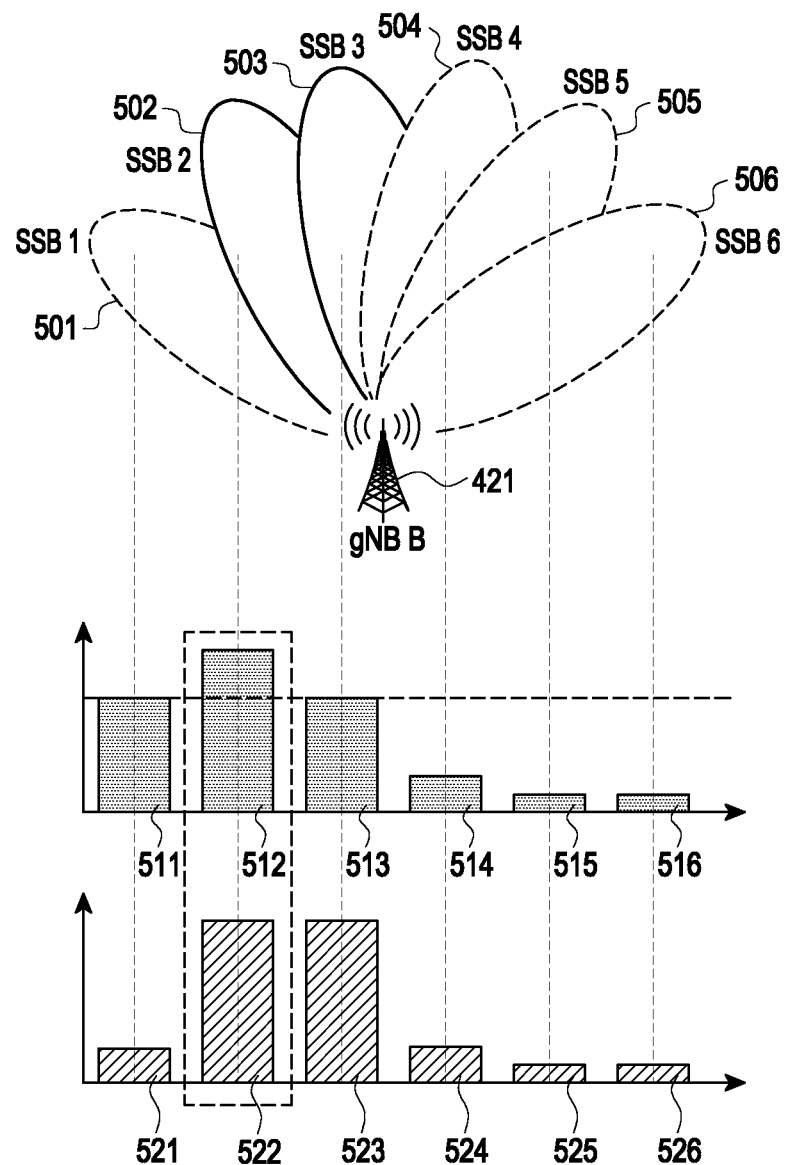
FIG. 5 is a diagram illustrating degrees of overlap between SSBs and a transmission signal for downlink traffic, formed in a gNB according to various embodiments.
Figure 6:
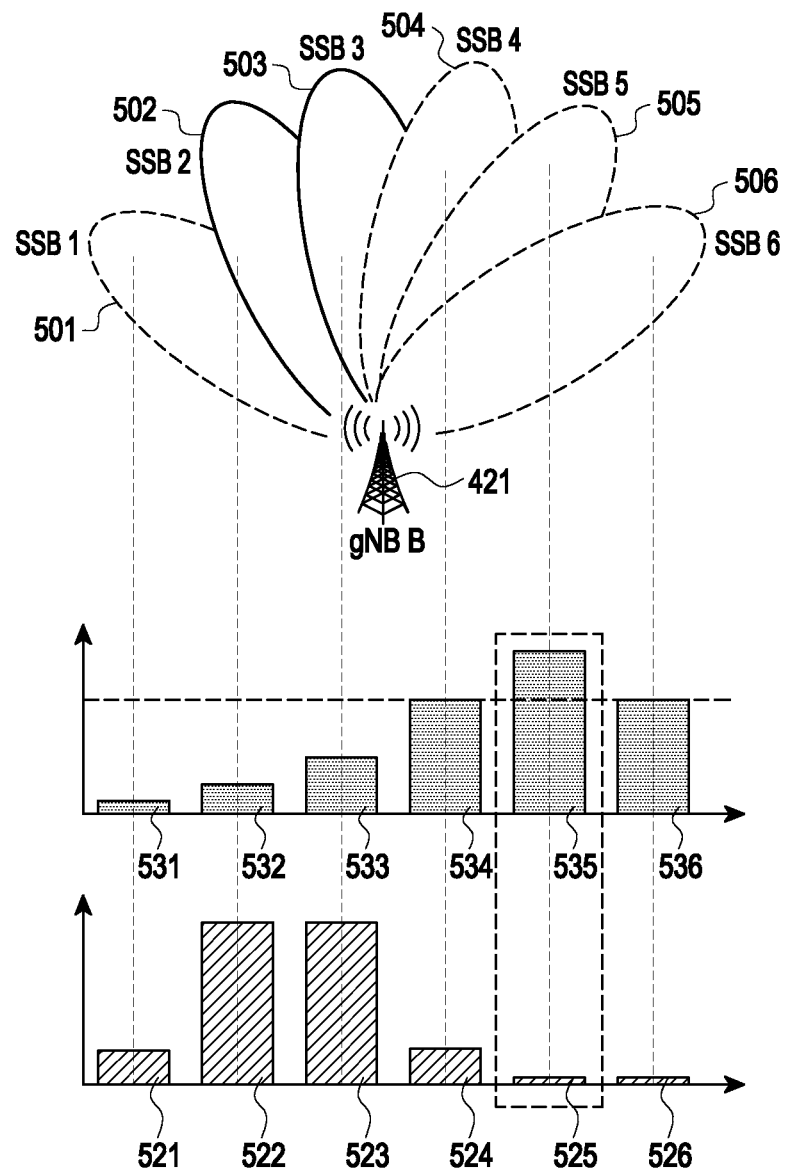
FIG. 6 is a diagram illustrating degrees of overlap between SSBs and a transmission signal for downlink traffic, formed in a gNB according to various embodiments.

FIGS. 5 and 6 are diagrams illustrating degrees of overlap between SSBs and a transmission signal for DL traffic, formed in a gNB according to various embodiments.

In an example, the second gNB 421 of FIG. 4 may periodically transmit an SSB burst including a plurality of SSBs 501, 502, 503, 504, 505, and 506. The plurality of SSBs 501, 502, 503, 504, 505, and 506 may be formed in different beamforming directions based on beam sweeping. In FIG. 5, reception strengths 511, 512, 513, 514, 515, and 516 of the plurality of SSBs 501, 502, 503, 504, 505, and 506 measured by the first UE 402 of FIG. 4 are shown. For example, the reception strength 512 of the SSB 502 may be greater than the other reception strengths 511, 513, 514, 515, and 516 at the first UE 402. At least some of the reception strengths 511, 512, 513, 514, 515, and 516 may be reported to the first gNB 401 based on satisfaction of a reporting condition (e.g., the A3 event), and the first gNB 401 may provide at least some of the reception strengths 511, 512, 513, 514, 515, and 516 to the RIC 101, for example, via an E2 interface. In various embodiments, the first UE 402 may be configured to perform MR on an SSB basis. In FIG. 5, an RSRP threshold for triggering a CoMP function may be shown. The RIC 101 may be configured to select a cell for the CoMP function, when identifying an RSRP equal to or greater than the RSRP threshold. As described above, a relatively large reception strength of an SSB from a neighbor cell may indicate that the neighbor cell is highly likely to cause interference, and the RSRP threshold may be, but not limited to, an empirical value set to substantially help to increase a data throughput. It will be understood by those skilled in the art that the threshold set in the unit of RSRP is simply an example, and that the threshold may be set in various units other than RSRP or a combination of at least two or more units.

In FIG. 5, degrees 521, 522, 523, 524, 525, and 526 of overlap between the beamforming direction of the transmission signal of the DL traffic provided by the second gNB 421 in FIG. 4 and the beamforming directions of the SSBs 501, 502, 503, 504, 505, and 506 are shown. The overlap degrees 521, 522, 523, 524, 525, and 526 may be, for example, real numbers equal to or greater than 0 and equal to or less than 1. However, the expression of the overlap degrees is not limited. In an example, the sum of the overlap degrees 521, 522, 523, 524, 525, and 526 may be, but not limited to, 1. For example, when the second gNB 421 transmits a transmission signal for DL traffic through the beam 434 as illustrated in FIG. 4, the second gNB 421 or the RIC 101 may identify the degrees 521, 522, 523, 524, 525, and 526 of overlap between the beamforming direction of the beam 434 and the beamforming directions of the SSBs 501, 502, 503, 504, 505, and 506. In an example, the beamforming direction of the beam 434 may be expressed based on, for example, a PMI, and the PMI may be represented in the dimensions of oversampled discrete Fourier transform (DFT) beams. The beamforming directions of the SSBs may be represented as areas in the dimensions of oversampled DFT beams. In an example, the degrees 521, 522, 523, 524, 525, and 526 of overlap between the beamforming direction of the transmission signal of the DL traffic provided by the second gNB 421 and the beamforming directions of the SSBs 501, 502, 503, 504, 505, and 506 may be determined based on whether the PMI of reported CSI is included in the areas of the SSBs. However, this is simply an example, and the method of determining the overlap degrees 521, 522, 523, 524, 525, and 526 is not limited, which will be described later. A relatively large degree of overlap may indicate that a relatively large number of slots of a transmission signal for DL traffic are allocated in the beamforming direction of a corresponding SSB. This may indicate that the beamforming direction of the transmission signal for the DL traffic and the beamforming direction of the SSB substantially overlap with each other, and thus the possibility of interference caused by the transmission signal for the DL traffic may be relatively high. For example, the overlap degrees 521, 522, 523, 524, 525, and 526 may be represented as ratios at which total slots allocated for the DL traffic by the second gNB 421 correspond to the respective SSBs 501, 502, 503, 504, 505, and 506. Therefore, those skilled in the art will understand that the overlap degrees 521, 522, 523, 524, 525, and 526 may be replaced with the terms, ratios. A degree of overlap may be a degree to which the bore-sight angle of a beam corresponding to a transmission signal for DL traffic overlaps with a horizontal beam angle range in which a specific SSB is transmitted, and determined, for example, based on the number of slots. For example, the overlap degree 521 may be a ratio of slots corresponding to the SSB 501 to the total slots allocated to the DL traffic by the second gNB 421. For example, in the case of the second gNB 421, it may be noted that the overlap degrees 522 and 523 are relatively high, which may indicate that the transmission signal for the actually formed DL traffic substantially overlaps with the SSBs 502 and 503. The RIC 101 may identify that the reception strength 512 of the SSB 502 measured by the first UE 402 is equal to or greater than the RSRP threshold, and the degree 522 of overlap between the transmission signal for the DL traffic and the SSB 502 formed by the second gNB 421 is relatively high (e.g., the overlap degree 522 is equal to or greater than an overlap degree threshold. Based on each of the two factors (e.g., the reception strength and overlap degree of an SSB) satisfying sub-conditions (e.g., the reception strength of the SSB is equal to or greater than the RSRP threshold and the overlap degree of the SSB is equal to or greater than the overlap degree threshold) to perform the CoMP function, the RIC 101 may determine the cell corresponding to the second gNB 421 as a cell to perform the CoMP function for the first UE 401.

Referring to FIG. 6, reception strengths 531, 532, 533, 534, 535, and 536 of the plurality of SSBs 501, 502, 503, 504, 505, 506 measured by the third UE 442 of FIG. 4 are shown. For example, the reception strength 535 of the SSB 505 may be greater than the other reception strengths 531, 532, 513, 534, and 536 at the third UE 442. At least some of the reception strengths 531, 532, 533, 534, 535, and 536 may be reported to the third gNB 441 based on satisfaction of a reporting condition (e.g., the A3 event), and the third gNB 441 may provide at least some of the reception strengths 531, 532, 533, 534, 535, and 536 to the RIC 101, for example, via an E2 interface. The RIC 101 may identify that the reception strength 535 of the SSB 505 is equal to or greater than the RSRP threshold. However, the RIC 101 may identify that a degree 525 of overlap between the transmission signal for the DL traffic and the SSB 505 formed by the second gNB 421 is relatively low (e.g., the overlap degree 525 is less than the overlap degree threshold). Based on the overlap degree 525 corresponding to the SSB 505 being less than the overlap degree threshold in spite of the reception strength of the SSB 505 equal to or greater than the RSRP threshold, the RIC 101 may not determine the cell corresponding to the second gNB 421 as a cell to perform a CoMP function for the third UE 403. This is because the second gNB 421 is unlikely to (or does not) actually form a transmission signal for DL traffic in the beamforming direction of the SSB 505, or the number of slots of the transmission signal for the DL traffic formed in the beam direction of the SSB 505 is relatively small, and thus the second gNB 421 will cause interference to the third gNB 442 with a low possibility.

Figure 7:
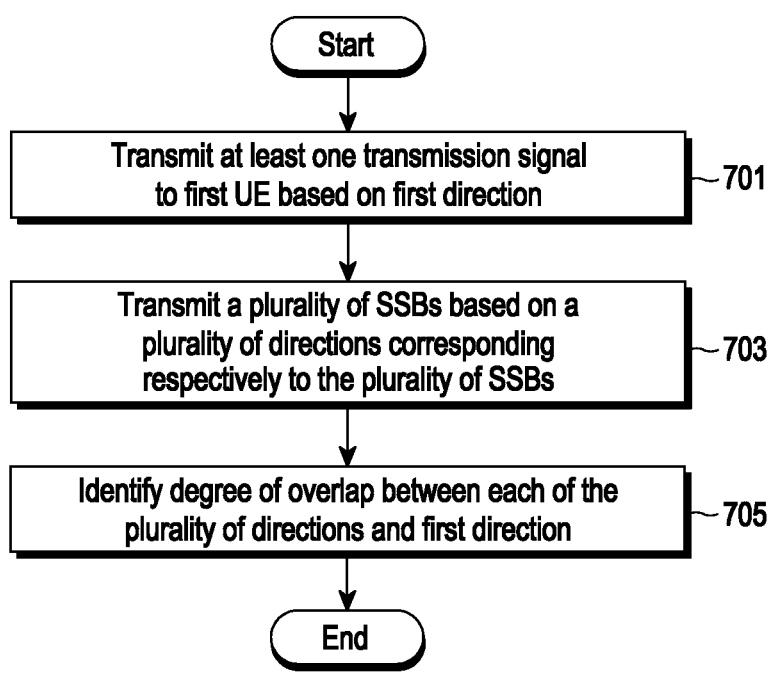
FIG. 7 is a flowchart illustrating an example method of operating a network according to various embodiments.
Figure 8A:
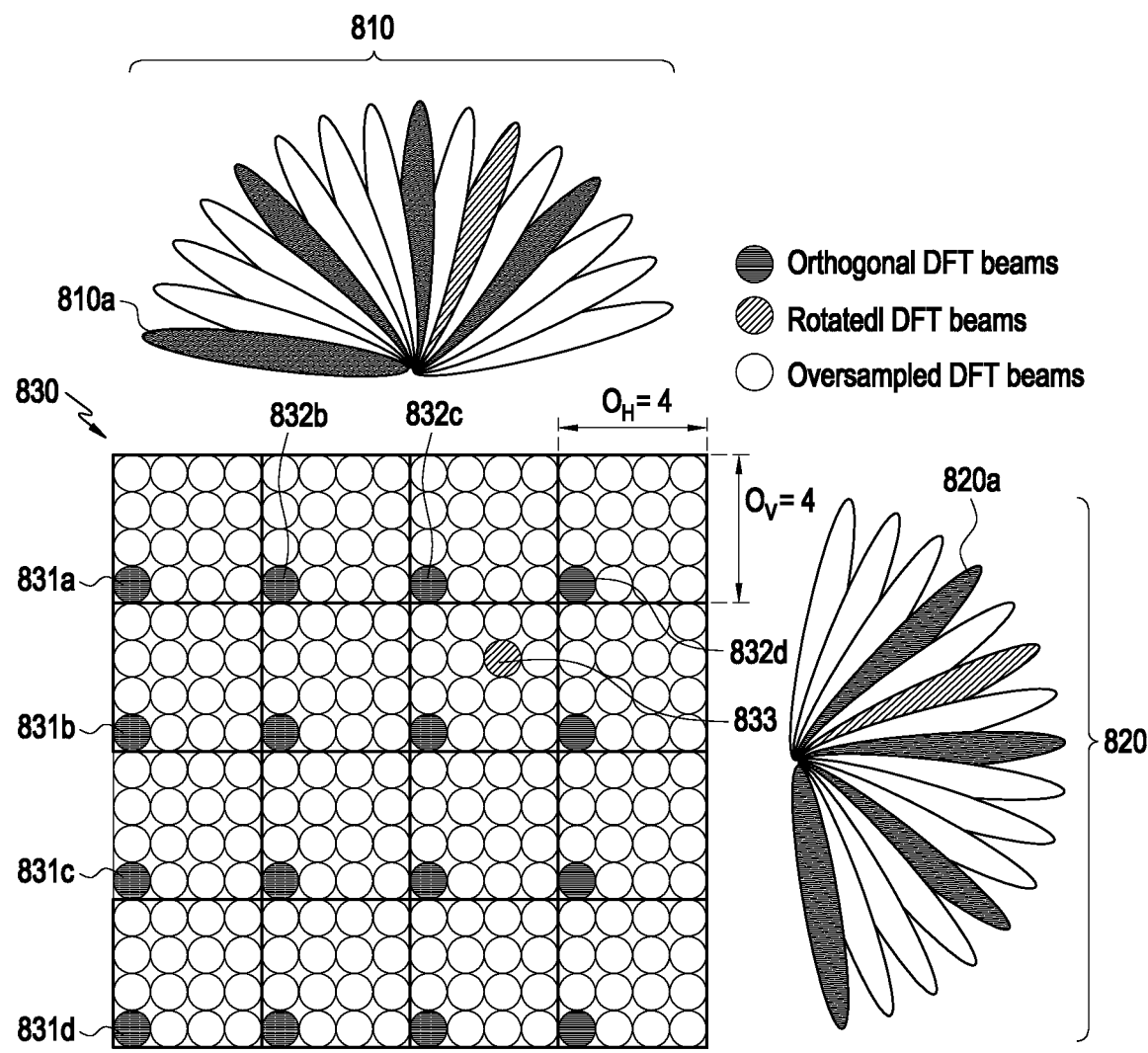
FIG. 8A is a diagram illustrating oversampled discrete Fourier transform (DFT) beams according to various embodiments.
Figure 8B:
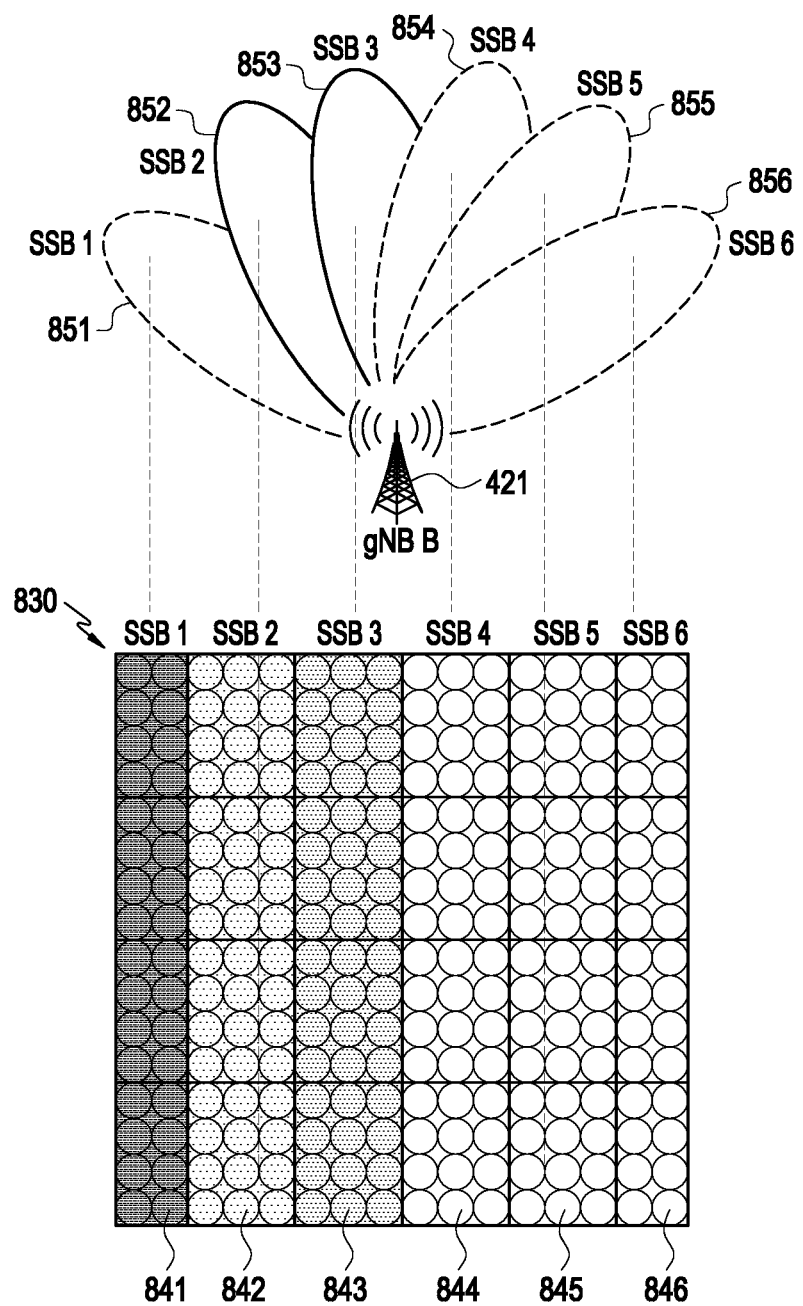
FIG. 8B is a diagram illustrating each of SSBs in the dimensions of oversampled DFT beams according to various embodiments.
Figure 8C:
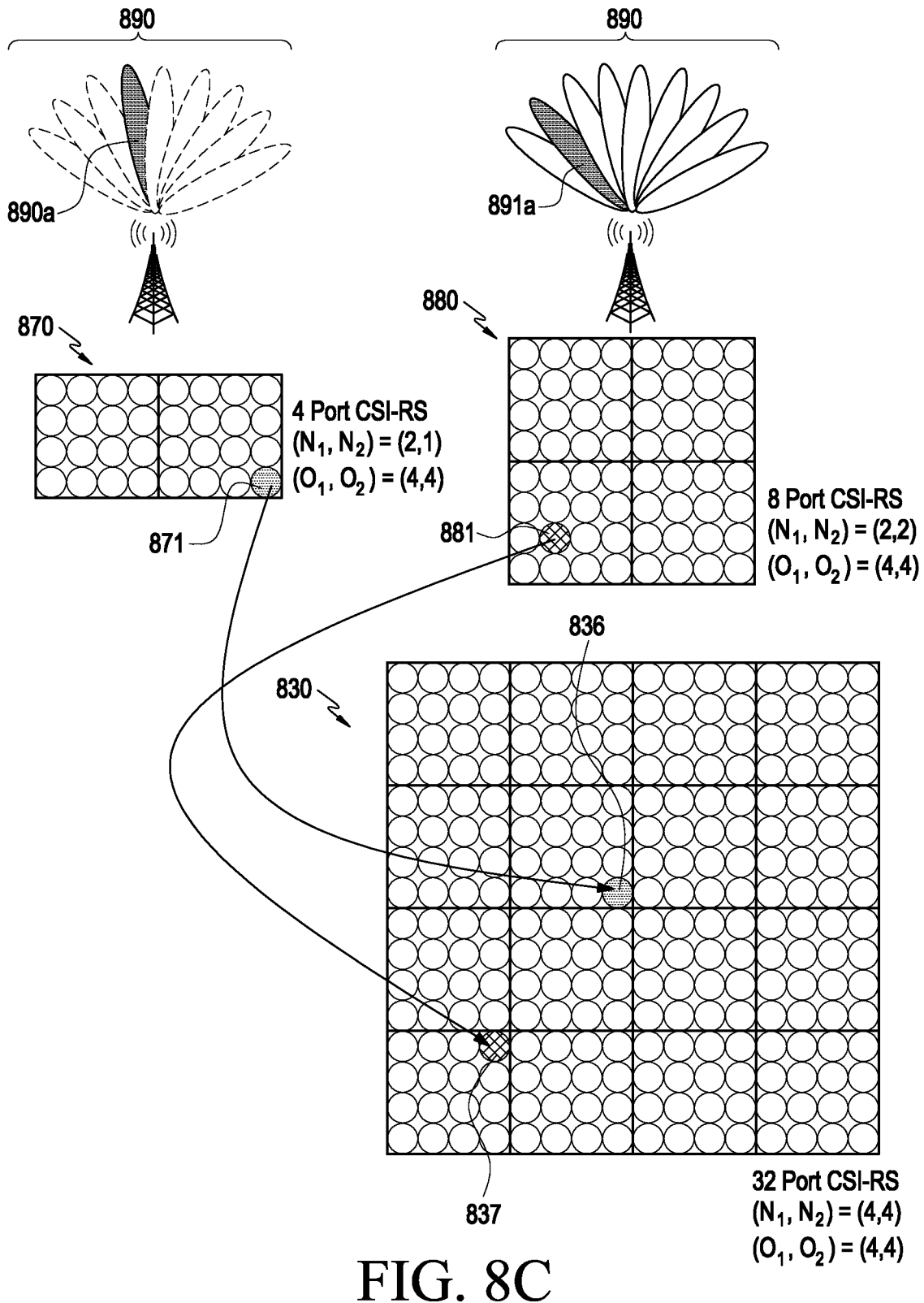
FIG. 8C is a diagram illustrating a mapping relationship between various numbers of ports according to various embodiments.

FIG. 7 is a flowchart illustrating an example method of operating a network according to various embodiments. The embodiment of FIG. 7 will be described with reference to FIGS. 8A, 8B and 8C. FIG. 8A is a diagram illustrating oversampled DFTs beam according to various embodiments. FIG. 8B is a diagram illustrating each of SSBs in the dimensions of oversampled DFT beams according to various embodiments. FIG. 8C is a diagram illustrating a mapping relationship between various numbers of ports according to various embodiments.

According to various embodiments, the network (e.g., the gNB 195) (e.g., the processor 120b) may transmit at least one transmission signal to a first UE based on a first direction in operation 701. The at least one transmission signal may be a transmission signal for DL traffic of the first UE. For example, the first direction may be a beamforming direction from the gNB. The first direction may be determined by the gNB, for example, based on an SSB index and/or CSI (e.g., PMI) reported by the first UE. However, the determination method is not limited. In operation 703, the network may transmit a plurality of SSBs based on a plurality of directions corresponding to the plurality of SSBs, respectively. The network may transmit the plurality of SSBs, for example, based on the plurality of directions corresponding to the plurality of SSBs, respectively, by performing beam sweeping. Transmission of each of the plurality of SSBs has been described before with reference to FIGS. 3 and 5, for example, and thus a redundant description may not be repeated here.

According to various embodiments, in operation 705, the network may identify a degree of overlap between each of the plurality of directions and the first direction. In an example, the network may identify the degree of overlap between each of the plurality of directions and the first direction, based on a ratio of the number of slots corresponding to the direction (or the SSB) to the total number of slots allocated for the DL traffic of the first UE. In another example, the network may identify the degree of overlap between each of the plurality of directions and the first direction, based on a ratio of the number of slots in which physical resource blocks (PRBs) are equal to or greater than a PRB threshold among slots corresponding to the direction (or the SSB) to the total number of slots allocated for the DL traffic of the first UE. The PRB threshold may be determined, for example, according to a user setting. However, the determination method is not limited. For example, it is assumed that the number of slots allocated for the DL traffic of the first UE is M. It is also assumed that the network performs beam sweeping on N SSBs. $k_1$ slots may correspond to a first SSB of the N SSBs, and $k_2$ slots may correspond to a second SSB of the N SSBs, among the M slots. In this manner, $k_N$ slots may correspond to an $N^{th}$ SSB among the N SSBs. The slot correspondence will be described in more detail with reference to FIGS. 8A and 8B. The sum of $k_1$ to $k_N$ may be M. The network may determine a first degree of overlap between the first direction and the direction of the first SSB by dividing $k_1$ by M, and a second degree of overlap between the first direction and the direction of the second SSB by dividing $k_2$ by M. In this manner, an $N^{th}$ degree of overlap between the first direction and the direction of the $N^{th}$ SSB by dividing $k_N$ by M. According to the example, the network may determine the degrees of overlap as illustrated in Table 1.

TABLE 1

| SSB | Degree of overlap |
|---|---|
| 1 | $k_1/M$ |
| 2 | $k_2/M$ |
| ... | ... |
| N | $k_N/M$ |

As will be described in more detail below, the network may provide the identified overlap degree of each of the SSBs to the RIC 101. The RIC 101 may identify that the reception strength of a specific SSB from a specific neighbor cell at a specific UE is equal to or greater than a threshold. For example, the RIC 101 may identify that the reception strength of the second SSB measured by a UE connected to another gNB is equal to or greater than the threshold. In this case, the RIC 101 may additionally identify the overlap degree corresponding to the specific SSB without directly selecting the specific neighbor cell as a cell to perform a CoMP function for the specific UE. For example, when the overlap degree $k_2/M$ of the second SSB is equal to or greater than an overlap degree threshold, the RIC 101 may determine the corresponding network as a cell to perform a CoMP function. For example, when the overlap degree $k_2/M$ of the second SSB is less than the overlap degree threshold, this may imply that the network transmits a relatively small portion of the transmission signal for the DL traffic in the direction corresponding to the second SSB, and thus the second SSB of the network will actually interfere with the specific UE with a low possibility. With reference to FIGS. 8A and 8B, an example of determining whether a transmission signal for DL traffic corresponds to an SSB will be described below.

Referring to FIG. 8A, dimensions 830 of oversampled DFT beams may be defined in a network. While the dimensions 830 of the oversampled DFT beams corresponding to a 32-port CSI-RS is shown in the example of FIG. 8A, the number of ports is not limited. In the dimensions 830 of the oversampled DFT beams, an x-axis direction may correspond to beams 810 having a first polarization direction, and a y-axis direction may correspond to beams 820 having a second polarization direction. For example, circles 831a, 831b, 831c, and 831d in the dimensions 830 may correspond to a beam 810a having the first polarization direction. For example, circles 832a, 832b, 832c, and 832d in the dimensions 830 may correspond to beams 820a having the second polarization direction. A circle 833 may correspond to a beam having a circular polarization, for example. Each of the circles in the dimensions 830 may correspond to, for example, a PMI index $i_{1,1}$ and/or an $i_{1,2}$ in the 3GPP standards. Referring to FIG. 8B, the network may form a plurality of SSBs 851, 852, 853, 854, 855, and 856 based on beam sweeping. A first SSB 851 may correspond to a first area 841 of the dimensions 830, a second SSB 852 may correspond to a second area 842 of the dimensions 830, a third SSB 853 may correspond to a third area 843 of the dimensions 830, a fourth SSB 854 may correspond to a fourth area 844 of the dimensions 830, a fifth SSB 855 may correspond to a fifth area 845 of the dimensions 830, and a sixth SSB 856 may correspond to a sixth area 846 of the dimensions 830. The number of the SSBs 851, 852, 853, 854, 855, and 856 may be determined based on at least one of a center frequency, a time division duplex (TDD) slot structure, or an operation policy. Those skilled in the art will understand that the mapping relationship of FIG. 8B may be changed according to beam directions in which the SSBs 851, 852, 853, 854, 855, and 856 are transmitted. Accordingly, the SSBs 851, 852, 853, 854, 855, and 856 may be displayed in association with PMIs. For example, when $i_{1,1}$ corresponding to the dimensions 830 has a range of 0 to 16, $i_{1,1}$ corresponding to the first area 841 may range from 0 to 1. This may indicate that a beam for DL traffic with $i_{1,1}$ of 0 or 1 corresponds to the first SSB 851. In this manner, a beam for DL traffic with $i_{1,1}$ of 2, 3, or 4 (e.g., included in the second area 842) may correspond to the second SSB 852. Accordingly, the network may identify an overlap degree based on the ratio of the number of slots corresponding to a PMI to the number of slots for the DL traffic. For example, it has been described that an overlap degree corresponding to the first SSB may be expressed as $k_1/M$ in Table 1, where $k_1$ may be the number of slots with a PMI included in the first area 841 in FIG. 8B. $k_i$ may be the number of slots included in an $i^{th}$ area (e.g., representable as 84*i*) of the dimensions 830 in FIG. 8B. The network may identify the overlap degree corresponding to each of the SSBs based on the number of slots corresponding to a PMI (e.g., $i_{1,1}$) fed back from a UE connected to the network. For example, when 32-port PMI-based beamforming is performed as illustrated in FIGS. 8A and 8B, the overlap degree corresponding to each of the SSBs may be identified based on the number of slots corresponding to a PMI (e.g., $i_{1,1}$) fed back from a UE connected to the network. In another example, when PMI-based beamforming with a different number of ports from 32 is performed, the number of oversampled DFT beams in a horizontal direction may be smaller than that of FIGS. 8A and 8B. In this case, oversampled DFT beams of non-32 ports may be mapped to the oversampled DFT beams of 32 ports at a ratio of, for example, 1:2, 1:3, or 1:4. The network may identify an overlap degree corresponding to each SSB based on a PMI fed back from the UE and the mapping relationship. For example, referring to FIG. 8C, dimensions 870 of oversampled DFT beams in the case a 4-port CSI-RS and dimensions 880 of oversampled DFT beams in the case of a 8-port CSI-RS are shown. A circle 871 in the dimensions 870 of the oversampled DFT beams with the 4-port CSI-RS may be mapped to, for example, a beam 836 in the dimensions 830 of the oversampled DFT beams with the 32-port CSI-RS. A circle 871 may correspond to, for example, a beam 890a among beams 890. A circle 881 in the dimensions 880 of oversampled DFT beams with the 8-port CSI-RS may be mapped to, for example, a circle 837 in the dimensions 830 of the oversampled DFT beams with the 32-port CSI-RS. The circle 881 may correspond to, for example, a beam 891a among beams 891.

As described above, the network may identify the overlap degree of each SSB and provide the identified overlap degree to the RIC 101. The RIC 101 may identify whether to determine a cell corresponding to the network as a cell to perform a CoMP function for a UE connected to another cell, based on the overlap degree of each SSB, received from the network. The RIC 101 may identify whether the network causes interference to the UE connected to the other cell, based on the overlap degree of each SSB, received from the network. In an example, when the reception strength of an SSB measured by the UE connected to the other cell is equal to or greater than a reception strength threshold, and additionally, when the overlap degree of the SSB is equal to or greater than an overlap degree threshold, the RIC 101 may identify that the corresponding cell causes interference to the UE connected to the other cell. Even though the reception strength of the SSB measured by the UE connected to the other cell is equal to or greater than the reception strength threshold, when the additional condition that the overlap degree of the SSB is equal to or greater than the overlap degree threshold is not satisfied, the RIC 101 may identify that the cell does not cause interference to the UE connected to the other cell.

Figure 9:
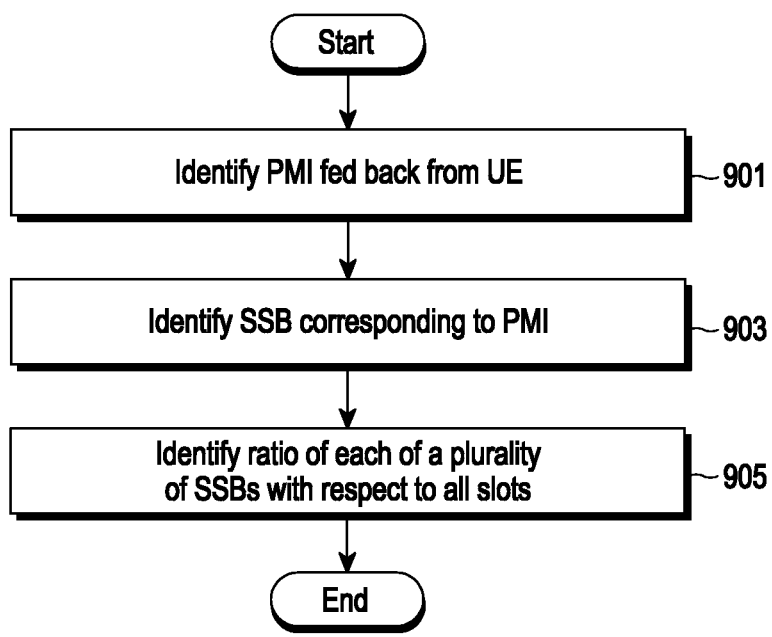
FIG. 9 is a flowchart illustrating an example method of operating a network according to various embodiments.

FIG. 9 is a flowchart illustrating an example method of operating a network according to various embodiments.

According to various embodiments, the network (e.g., the gNB 195) (e.g., the processor 120b) may identify a PMI fed back from a UE in operation 901. The network may identify an SSB corresponding to the PMI in operation 903. For example, the network may identify the SSB corresponding to the PMI by identifying an area in which the PMI (e.g., $i_{1,1}$) is included among the areas 841, 842, 843, 844, 845, and 846 of FIG. 8B. For example, based on $i_{1,1}$ of 3 being included in the second area 842, the network may identify that the SSB corresponding to the PMI is the second SSB 852 corresponding to the second area 842. The network may identify the SSB with respect to all slots. In operation 905, the network may identify a ratio of each of a plurality of SSBs with respect to the total slots, and identify the ratio, for example, as an overlap degree corresponding to the SSB. As described above, the network may identify the SSB with respect to the total slots, and accordingly, identify the number of slots corresponding to each of the SSBs. The network may identify the ratio of the number of slots corresponding to the SSB to the total number of slots, and identify the ratio, for example, as the overlap degree corresponding to the SSB. The network may provide the overlap degree corresponding to each of the SSBs to the RIC 101. For example, the network may provide the overlap degree corresponding to each of the SSBs to the RIC 101 via an E2 interface, which should not be construed as limiting. As described in more detail later, the RIC 101 may use the overlap degree corresponding to each of the SSBs received from the network to determine whether to determine a cell corresponding to the network as a cell to perform a CoMP function.

Figure 10:
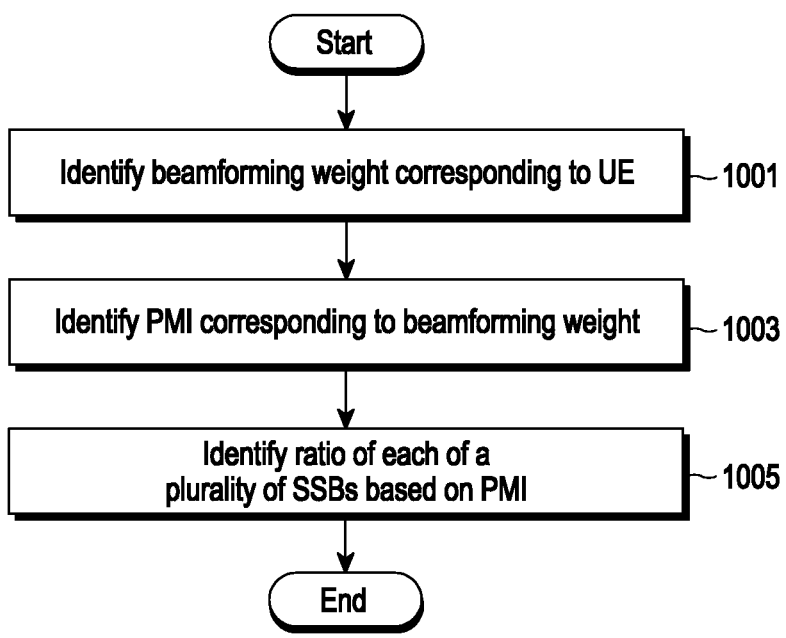
FIG. 10 is a flowchart illustrating an example method of operating a network according to various embodiments.

FIG. 10 is a flowchart illustrating an example method of operating a network according to various embodiments.

According to various embodiments, the network (e.g., the gNB 195) (e.g., the processor 120b) may identify a beamforming weight corresponding to a UE in operation 1001. The network may identify a PMI corresponding to the beamforming weight in operation 1003. For example, when sounding reference signal (SRS)-based beamforming is performed, the network may identify a beamforming weight based on the reciprocity between a UL channel and a DL channel, without using a PMI fed back from the UE. In this case, the network may determine a beamforming weight similar to the identified beamforming weight. The network may identify a PMI (e.g., $i_{1,1}$) corresponding to the identified similar beamforming weight. In an example, the network may identify a norm operation result of a matrix product between a matrix of beamforming weights identified based on reciprocity and each of similar beamforming weight candidates. The network may determine a candidate having a maximum calculation result as a similar beamforming weight and identify a PMI corresponding to the similar beamforming weight. The above-described PMI determination method is simply an example, and the method of determining a PMI corresponding to a beamforming weight by the network is not limited.

According to various embodiments, in operation 1005, the network may identify a ratio for each of a plurality of SSBs based on the identified PMI. The network may identify the ratio of each of the plurality of SSBs to total slots based on the identified PMI and identify the ratio, for example, as an overlap degree corresponding to the SSB. As described above, the network may identify the similar beamforming weight with respect to the total slots, and identify a PMI corresponding to each of all slots based on the identified similar beamforming weight. The network may identify an SSB corresponding to the PMI, and accordingly, identify the number of slots corresponding to each of the SSBs. The network may identify the ratio of the number of slots corresponding to the SSB to the total number of slots, and identify the ratio, for example, as the overlap degree corresponding to the SSB. The network may provide the overlap degree corresponding to each of the SSBs to the RIC 101. For example, the network may provide the overlap degree corresponding to each of the SSBs to the RIC 101 through, but not limited to, an E2 interface. As described in more detail later, the RIC 101 may use the overlap degree corresponding to each of the SSBs received from the network to identify whether to determine a cell corresponding to the network as a cell to perform a CoMP function.

Figure 11A:
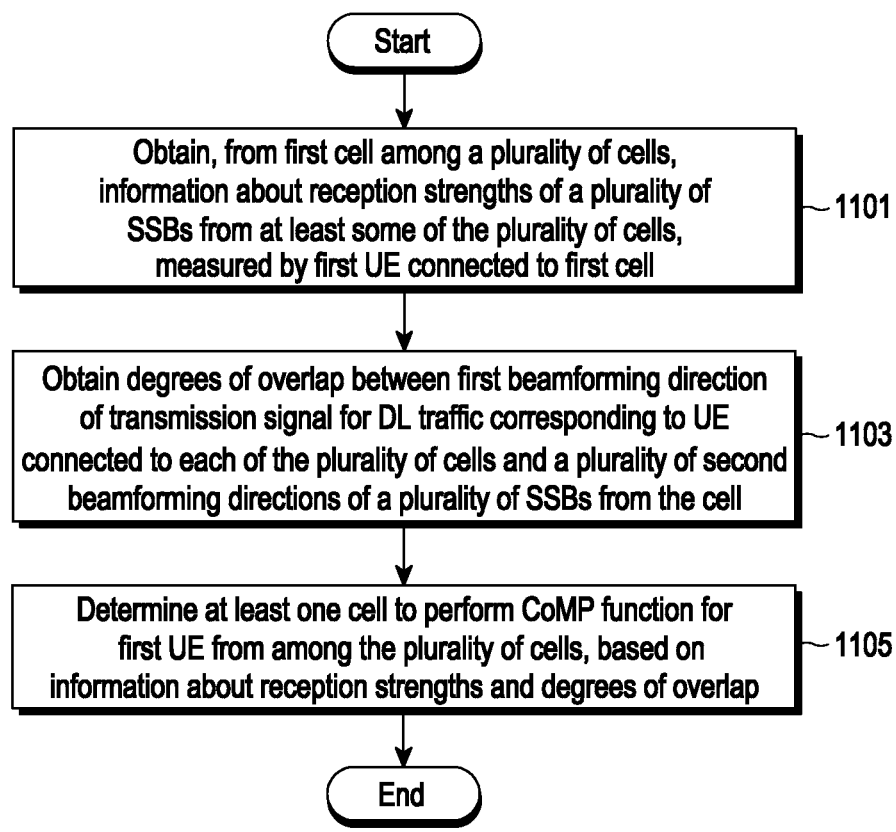
FIG. 11A is a flowchart illustrating an example method of operating a network according to various embodiments.
Figure 11B:
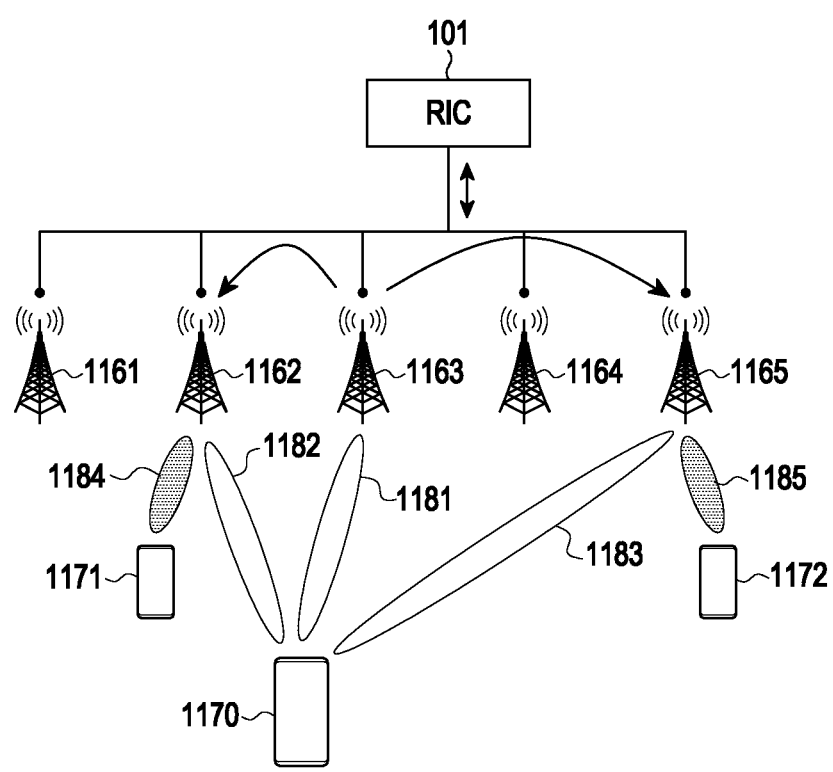
FIG. 11B is a diagram illustrating data transmission/reception between an RIC and gNBs according to various embodiments.

FIG. 11A is a flowchart illustrating an example method of operating a network according to various embodiments. The embodiment of FIG. 11A will be described with reference to FIG. 11B. FIG. 11B is a diagram illustrating data transmission/reception between an RIC and a gNB according to various embodiments.

Referring to FIGS. 11A and 11B together, according to various embodiments, the RIC 101 (or an electronic device configured to perform the functions of the RIC) (e.g., the processor 120a) may obtain information about reception strengths of a plurality of SSBs (SSBs including SSBs 1182 and 1183 of FIG. 11B) from at least some (e.g., at least one cell 1162 and 1165 of FIG. 11B) of a plurality of cells measured by a first UE (e.g., a UE 1170 of FIG. 11B) connected to a first cell (e.g., a cell 1163 of FIG. 11B) from the first cell (e.g., a cell 1163 of FIG. 11B) among a plurality of cells 1161, 1162, 1163, 1164 and 1165 of FIG. 11B. For example, the UE 1170 of FIG. 11B may report the reception strength of the SSB 1182 from the neighbor cell 1162 to a serving cell, that is, the cell 1163, based on the reception strength of the SSB 1182 from the neighbor cell 1162 satisfying a reporting condition. The cell 1163 as the serving cell may provide the reception strength of the SSB 1182 measured by the UE 1170 to the RIC 101 through an E2 interface. The UE 1170 may report the reception strength of the SSB 1183 from the neighbor cell 1165 to the cell 1163 as the serving cell, based on the reception strength of the SSB 1183 satisfying the reporting condition. The cell 1163 as the serving cell may provide the reception strength of the SSB 1183 measured by the UE 1170 to the RIC 101 through the E2 interface.

According to various embodiments, in operation 1103, the RIC 101 may obtain association information between a first beam direction for data transmission corresponding to a UE connected to each of a plurality of cells (e.g., the cells 1161, 1162, 1163, 1164, and 1165 of FIG. 11B) and a plurality of second beamforming directions of a plurality of SSBs from the cell (e.g., the cell 1161, 1162, 1163, 1164, or 1165 of FIG. 11B). For example, referring to FIG. 11B, the RIC 101 may receive association information between a first beamforming direction for data transmission (e.g., the beamforming direction of the beam 1811) corresponding to the UE 1170 connected to the cell 1163 and a second beamforming direction of each of SSBs from the cell 1163, for example, an overlap degree corresponding to each of the SSBs from the cell 1163. For example, the cell 1163 may identify the degree of overlap between each of the SSBs and a transmission signal for DL traffic of the UE 1170 as association information based on the above-described method. The cell 1163 may provide the identified association information (e.g., the overlap degree of each of the SSBs) to the RIC 101 through the E2 interface. For example, referring to FIG. 11B, the RIC 101 may receive association information between a first beamforming direction for data transmission (e.g., the beamforming direction of a beam 1184) corresponding to a UE 1171 connected to the cell 1162 and each of SSBs (e.g., SSBs including the SSB 1182) of the cell 1162, for example, an overlap degree corresponding to each of the SSBs from the cell 1162. For example, the overlap degree may include a degree of overlap between the SSB 1182 and the beam 1184 for data transmission. The cell 1162 may provide the identified association information (e.g., the overlap degree of each of the SSBs) to the RIC 101 through an E2 interface. For example, referring to FIG. 11B, the RIC 101 may receive association information between a first beamforming direction for data transmission (e.g., the beamforming direction of a beam 1185) corresponding to a UE 1172 connected to the cell 1165 and each of SSBs (e.g., SSBs including the SSB 1183) of the cell 1165, for example, an overlap degree corresponding to each of the SSBs from the cell 1165. For example, the overlap degrees may include a degree of overlap between the SSB 1183 and the beam 1185 for data transmission. The cell 1165 may provide the identified association information (e.g., the overlap degree of each of the SSBs) to the RIC 101 through an E2 interface.

According to various embodiments, in operation 1105, the RIC 101 may determine at least one cell to perform a CoMP function together with the first cell, for the first UE, from among the plurality of cells, based on the information about reception strengths and the association information. For example, the RIC 101 may identify that the reception strength of the SSB 1182 measured at the UE 1170 is equal to or greater than a reception strength threshold, and the reception strength of the SSB 1183 measured at the UE 1170 is equal to or greater than the reception strength threshold.

The RIC 101 may identify that the degree of overlap between the beam 1184 of the transmission signal for the DL traffic of the cell 1162 and the SSB 1182 is equal to or greater than an overlap degree threshold, and the overlap degree between the beam 1185 of the transmission signal for the DL traffic of the cell 1162 and the SSB 1183 is equal to or greater than the overlap degree threshold. Based on the reception strength of the SSB 1182 being equal to or greater than the reception strength threshold and the degree overlap between the beam 1184 of the transmission signal of the DL traffic of the cell 1162 and the SSB 1182 being equal to or greater than the overlap degree threshold, the RIC 101 may determine the cell 1162 as a cell to perform a CoMP function (e.g., beam nulling) for the UE 1170. Based on the reception strength of the SSB 1183 being equal to or greater than the reception strength threshold and the degree of overlap between the beam 1185 of the transmission signal of the DL traffic of the cell 1165 and the SSB 1183 being less than the overlap degree threshold, the RIC 101 may not determine the cell 1165 as a cell to perform a CoMP function (e.g., beam nulling) for the UE 1170. The determination of a cell to perform a CoMP function in operation 1105 is simply an example, and operation 1105 may be replaced with another operation. For example, the RIC 101 may determine whether a neighbor cell causes interference to the first UE based on information about reception strengths and association information. The RIC 101 may perform a corresponding operation based on the identification that the neighbor cell causes interference to the first UE. For example, to perform at least one of full-duplex, dynamic TDD, or multicast offloading, it should be identified whether a neighbor cell causes interference. In this case, it may be identified whether interference is caused based on a reception strength and an overlap degree.

According to various embodiments, the RIC 101 may provide information identifying the cell to perform the CoMP function to the cell to perform the CoMP function, and/or the serving cell. For example, the serving cell may receive identification information about the cell to perform the CoMP function from the RIC 101 and request the cell to perform the CoMP function. Accordingly, the CoMP function may be performed.

Figure 12:
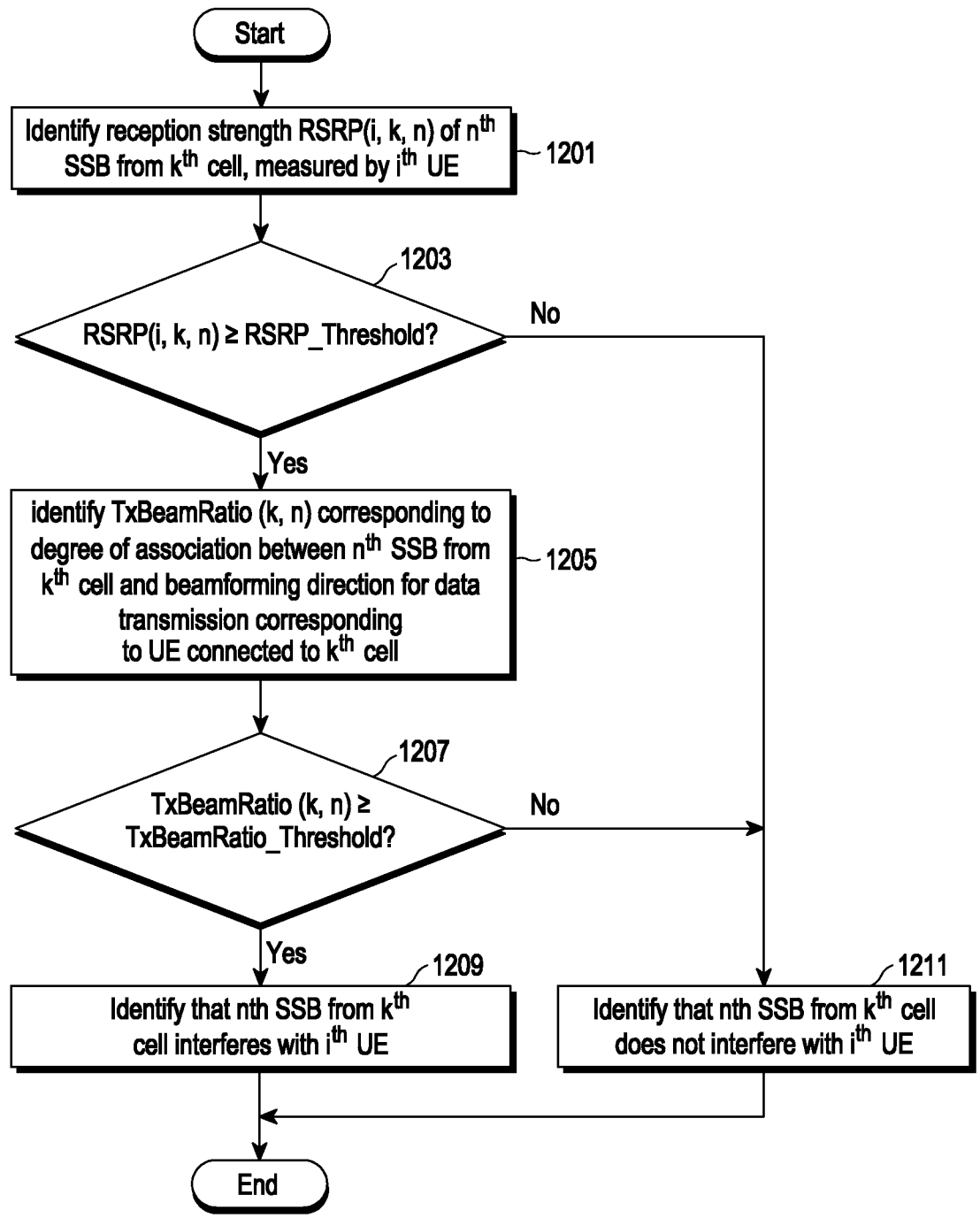
FIG. 12 is a flowchart illustrating an example method of operating an RIC according to various embodiments.

FIG. 12 is a flowchart illustrating an example method of operating an RIC according to various embodiments.

According to various embodiments, the RIC 101 (or an electronic device configured to perform the functions of the RIC) (e.g., the processor 120*a*) may identify RSRP(i, k, n), which is the reception strength of an $n^{th}$ SSB from a $k^{th}$ cell, measured by an $i^{th}$ UE in operation 1201. When the $k^{th}$ cell is the serving cell of the $i^{th}$ UE, RSRP(i, k, n) may represent the RSRP of an SSB from the serving cell, and when the $k^{th}$ cell is a neighbor cell of the $i^{th}$ UE, RSRP(i, k, n) may represent the RSRP of an SSB from the neighbor cell. Although k may be expressed, for example, as at least one of a PCI, a Cell ID, or a CGI, those skilled in the art will understand that k may be any information as long as the information identifies a cell. In operation 1203, the RIC 101 may identify whether RSRP(i, k, n) is equal to or greater than RSRP_Threshold. RSRP_Threshold may be, for example, a value set to perform a CoMP function. RSRP is simply an example, and the unit in which a threshold is represented is not limited. If RSRP(i, k, n) is less than RSRP_Threshold (1203—No), the RIC 101 may identify that the $n^{th}$ SSB from the $k^{th}$ cell does not interfere with the $i^{th}$ UE in operation 1211.

If RSRP(i, k, n) is equal to or greater than RSRP_Threshold (1203—Yes), the RIC 101 may identify TxBeamRatio (k,n) corresponding to a degree to which the $n^{th}$ SSB from the $k^{th}$ cell is associated with a beamforming direction for data transmission corresponding to a UE connected to the $k^{th}$ cell in operation 1205. TxBeamRatio(k,n) may be, for example, the degree of overlap between the $n^{th}$ SSB and a transmission signal for DL traffic and expressed as, for example, TxBeamSlotCount(k, n)/TotalSlotNum. TxBeamSlotCount(k, n) may be the number of slots counted when the bore-sight angle of the beam of the transmission signal for the DL traffic in the $k^{th}$ cell is included in a horizontal beam angle range in which the $n^{th}$ SSB is transmitted. Since counting the number of corresponding slots has been described before, its description will not be repeated herein. TotalSlotNum may be the number of DL slots during a time period in which the KPI of TxBeamRatio(k,n) is updated.

In operation 1207, the RIC 101 may identify whether TxBeamRatio(k,n) is equal to or greater than TxBeamRatio_Threshold. For example, TxBeamRatio_Threshold may be determined as, but not limited to, a value representing substantial overlap between the SSB and the transmission signal for the DL traffic. When TxBeamRatio(k, n) is less than TxBeamRatio_Threshold (1207—No), the RIC 101 may identify that the $n^{th}$ SSB from the $k^{th}$ cell does not interfere with the $i^{th}$ UE in operation 1211. If TxBeamRatio (k,n) is equal to or greater than TxBeamRatio_Threshold (1207—Yes), the RIC 101 may identify that the $n^{th}$ SSB from the $k^{th}$ cell interferes with the $i^{th}$ UE in operation 1209. Subsequently, the RIC 101 may determine, for example, the $k^{th}$ cell as a cell to perform a CoMP function (e.g., beam nulling) for the $i^{th}$ UE. The RIC 101 may provide information identifying the cell to perform the CoMP function to the serving cell of the $i^{th}$ UE and/or the cell to perform the CoMP function.

Figure 13:
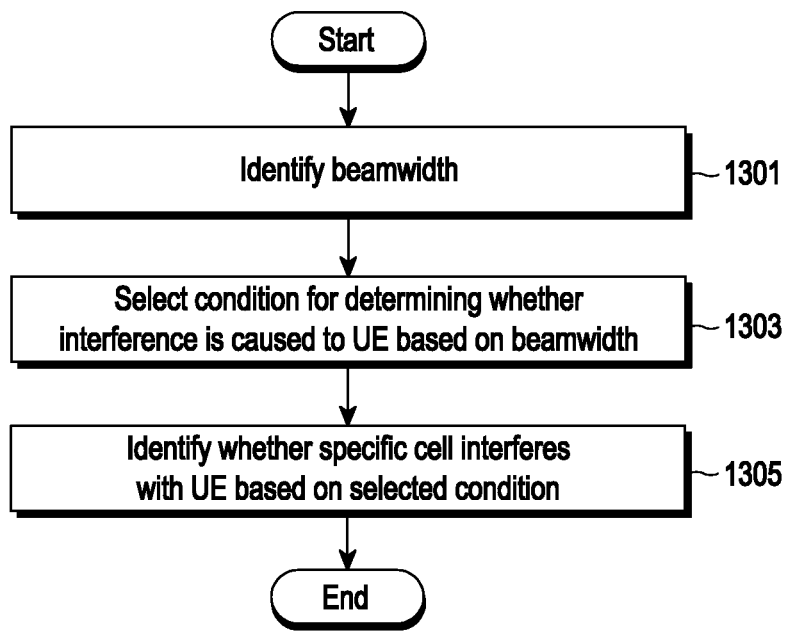
FIG. 13 is a flowchart illustrating an example method of operating an RIC according to various embodiments.

FIG. 13 is a flowchart illustrating an example method of operating an RIC according to various embodiments.

According to various embodiments, the RIC 101 (or, an electronic device configured to perform the functions of the RIC) (e.g., the processor 120*a*) may identify the beamwidth of a beam (e.g., a beam corresponding to an SSB and/or a transmission signal for DL traffic) used by a specific cell in operation 1301. The specific cell may provide information related to the formed beamwidth to the RIC 101 via an E2 interface. In operation 1303, the RIC 101 may select a condition for determining whether a UE connected to another cell is interfered based on the beamwidth. For example, the RIC 101 may set a different condition for determining whether interference exists, for each beamwidth. In an example, when the beamwidth is less than a beamwidth threshold, the RIC 101 may use a first condition for determining whether interference exists, and when the beamwidth is equal to or greater than the beamwidth threshold, the RIC 101 may use a second condition to determine whether interference exists. However, the use of one of the two conditions to determine whether interference exists, depending on whether a beamwidth is greater than or equal to a beamwidth threshold is simply example, and the number of candidate conditions for determining whether interference exists may be 3 or larger. In operation 1305, the RIC 101 may identify whether a specific cell interferes with the UE based on the selected condition.

Figure 14:
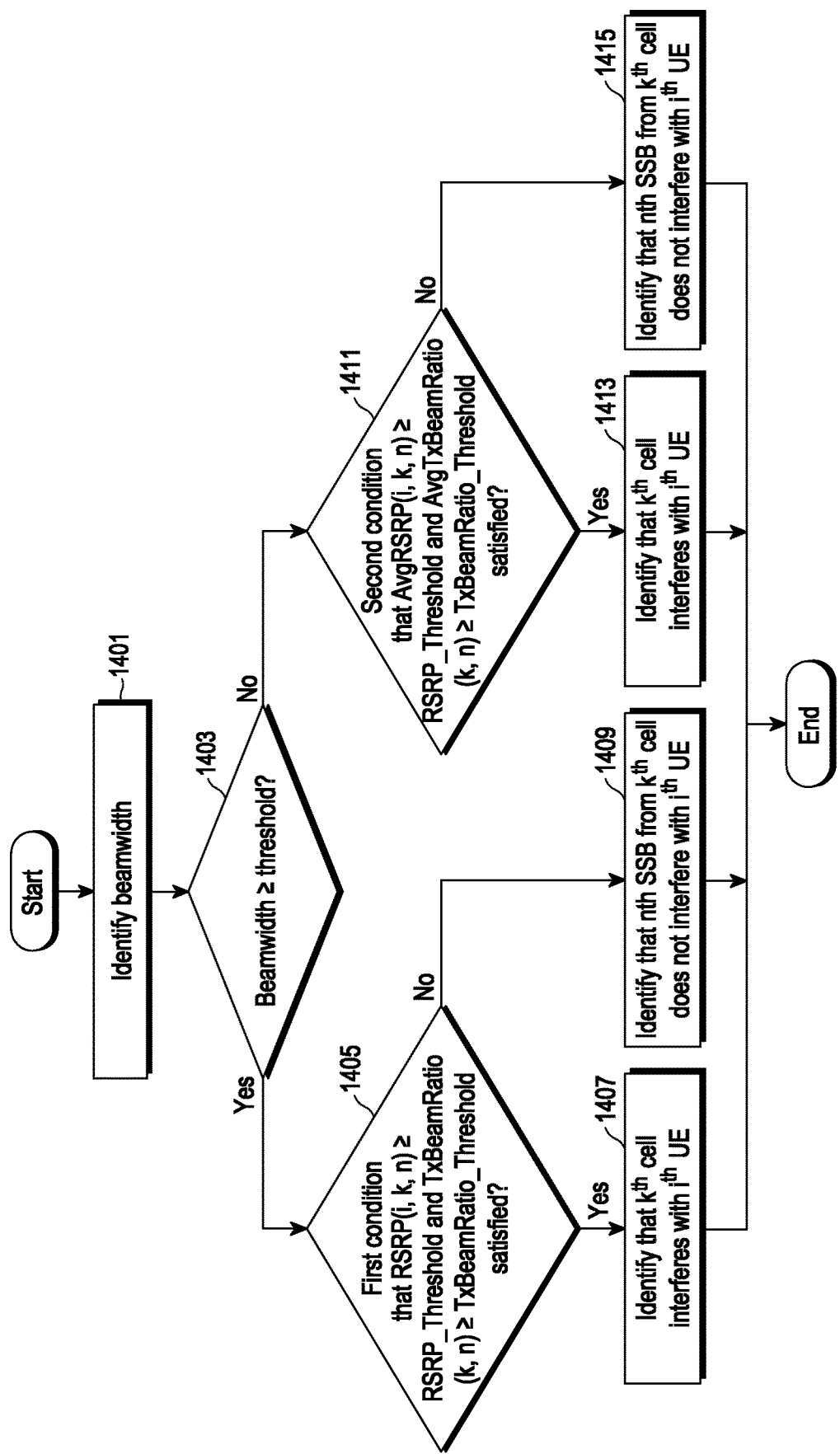
FIG. 14 is a flowchart illustrating an example method of operating an RIC according to various embodiments.

FIG. 14 is a flowchart illustrating an example method of operating an RIC according to various embodiments.

According to various embodiments, the RIC 101 (or an electronic device configured to perform the functions of the RIC) (e.g., the processor 120*a*) may identify the beamwidth (e.g., the beamwidth of an SSB and/or a transmission signal for DL traffic) of a $k^{th}$ cell in operation 1401.

The RIC 101 may identify whether the beamwidth is equal to or greater than a beamwidth threshold in operation 1403. The beamwidth threshold may be, but not limited to, for example, a value between 30 and 45 degrees. If the beamwidth is equal to or greater than the beamwidth threshold (1403—Yes), the RIC 101 may identify whether a first condition that RSRP(i, k, n) is equal to or greater than RSRP_Threshold, and TxBeamRatio(k,n) is equal to or greater than TxBeamRatio_Threshold is satisfied in operation 1405. Since the sub-condition that RSRP(i, k, n) is equal to or greater than RSRP_Threshold and the sub-condition that TxBeamRatio(k, n) is equal to or greater than TxBeamRatio_Threshold have been described before, the description will not be repeated herein. If the first condition is satisfied (1405—Yes), the RIC 101 may determine that the $k^{th}$ cell interferes with the $i^{th}$ UE in operation 1407. If the first condition is not satisfied (1405—No), the RIC 101 may determine that the $k^{th}$ cell does not interfere with the $i^{th}$ UE in operation 1409.

According to various embodiments, if the beamwidth is less than a beamwidth threshold (1403—No), the RIC 101 may identify whether a second condition that AvgRSRP(i, k, n) is equal to or greater than RSRP_Threshold, and AvgTxBeamRatio(k,n)) is equal to greater than TxBeamRatio_Threshold is satisfied in operation 1411. AvgRSRP(i, k, n) may be the average of the RSRP of an $n^{th}$ SSB from a $k^{th}$ cell, measured by an $i^{th}$ UE and the RSRP of at least one SSB neighboring to the $n^{th}$ SSB from the $k^{th}$ cell, measured by the $i^{th}$ UE. For example, when AvgRSRP(i, k, n) is set for two SSBs, AvgRSRP(i, k, n) may be determined by Equation 1.

$$AvgRSRP(i,k,n)=(RSRP(i,k,n)+RSRP(i,k,n+1))/2 \quad \text{[Equation 1]}$$

On the other hand, identifying AvgRSRP (i, k, n) as the average of two RSRPs is merely exemplary, and the number of RSRPs (in other words, AvgWindowSize) for identifying the average of RSRPs is not limited. When the beamwidth is relatively small, an average value of a relatively large number of SSBs needs to be used in case where the beamwidth is relatively large, in order to accurately determine whether interference occurs.

According to various embodiments, AvgTxBeamRatio(k, n) may be the sum of BeamRatio corresponding to the $n^{th}$ SSB from the $k^{th}$ cell and BeamRatio corresponding to at least one adjacent SSB. For example, when AvgTxBeamRatio(k,n) is set for two SSBs, AvgTxBeamRatio(k,n) may be determined by Equation 2.

$$AvgTxBeamRatio(k,n)=TxBeamRatio(k,n)+TxBeamRatio(k,n+1) \quad \text{[Equation 2]}$$

On the other hand, identifying AvgTxBeamRatio(k,n) as the sum of two BeamRatios, and the number of BeamRatios used to identify the sum is not limited. Alternatively, AvgTxBeamRatio(k,n) may be set to a value obtained by dividing the result of Equation 2 by the number (e.g., 2) of BeamRatios.

According to various embodiments, when the second condition is satisfied (e.g., 1411—Yes), the RIC 101 may determine that the $k^{th}$ cell interferes with the $i^{th}$ UE in operation 1413. When the second condition is not satisfied (1411—NO), the RIC 101 may determine that the $k^{th}$ cell does not interfere with the $i^{th}$ UE in operation 1415.

In various embodiments, the RIC 101 may identify whether the first condition as well as the second condition is satisfied in operation 1405 and/or operation 1411. For example, when both the first condition and the second condition are satisfied, the RIC 101 may determine that the $k^{th}$ cell interferes with the $i^{th}$ UE. For example, when either of the first condition and the second condition is not satisfied, the RIC 101 may determine that the $k^{th}$ cell does not interfere with the $i^{th}$ UE.

According to various example embodiments, a method of operating a network may include transmitting to a first UE connected to the network, at least one transmission signal for downlink traffic corresponding to the first UE based on a first direction, transmitting a plurality of SSBs configured by the network, based on a plurality of directions corresponding respectively to the plurality of SSBs, and identifying a degree of overlap between each of the plurality of directions corresponding respectively to the plurality of SSBs and the first direction.

According to various example embodiments, the degree of overlap between each of the plurality of directions and the first direction may be a degree of overlap between a boresight angle of a beam corresponding to the at least one transmission signal for the downlink traffic corresponding to the first UE and an angle range of a horizontal beam corresponding to the plurality of SSBs.

According to various example embodiments, identifying the degree of overlap between each of the plurality of directions corresponding respectively to the plurality of SSBs and the first direction may include identifying a total number of all slots corresponding to the at least one transmission signal for the downlink traffic corresponding to the first UE, identifying a sub-number corresponding to each of the plurality of SSBs among all the slots, and identifying the degree of overlap by dividing the sub-number by the total number.

According to various example embodiments, identifying the sub-number corresponding to each of the plurality of SSBs among all the slots may include identifying each of PMI ranges corresponding respectively to the plurality of SSBs, identifying at least one PMI associated with the at least one transmission signal for the downlink traffic, for each of all the slots, and identifying each of the sub-numbers corresponding respectively to the plurality of SSBs, based on a PMI range to which each of the at least one PMI belongs among the PMI ranges, for each of all the slots.

According to various example embodiments, the at least one PMI associated with the at least one transmission signal for the downlink traffic may be represented in dimensions of an oversampled DFT beam, and each of the PMI ranges corresponding respectively to the plurality of SSBs may be represented in the dimensions of the oversampled DFT beam.

According to various example embodiments, identifying the sub-number corresponding to each of the plurality of SSBs among all the slots may include identifying a beamforming weight corresponding to the first UE, for each of all the slots, identifying a PMI corresponding to each of the beamforming weights, identifying each of PMI ranges corresponding respectively to the plurality of SSBs, and identifying the sub-number corresponding to each of the plurality of SSBs, based on a PMI range to which each of the at least one PMI belongs among the PMI ranges, for each of all the slots.

According to various example embodiments, identifying the sub-number corresponding to each of the plurality of SSBs among all the slots may include identifying a sub-number associated with physical resource blocks (PRBs) equal to or greater than a PRB threshold, corresponding to each of the plurality of SSBs.

According to various example embodiments, the method may further include providing the degree of overlap between each of the plurality of directions and the first direction to an RIC via an E2 interface.

According to various example embodiments, a BS may include an RF device and a processor. The processor may be configured to control the RF device to transmit to a first UE connected to the BS, at least one transmission signal for downlink traffic corresponding to the first UE based on a first direction, control the RF device to transmit a plurality of SSBs configured by the BS, based on a plurality of directions corresponding respectively to the plurality of SSBs, and identify a degree of overlap between each of the plurality of directions corresponding respectively to the plurality of SSBs and the first direction.

According to various example embodiments, the degree of overlap between each of the plurality of directions and the first direction may be a degree of overlap between a bore-sight angle of a beam corresponding to the at least one transmission signal for the downlink traffic corresponding to the first UE and an angle range of a horizontal beam corresponding to the plurality of SSBs.

According to various example embodiments, as at least part of identifying the degree of overlap between each of the plurality of directions corresponding respectively to the plurality of SSBs and the first direction, the processor may be configured to identify a total number of all slots corresponding to the at least one transmission signal for the downlink traffic corresponding to the first UE, identify a sub-number corresponding to each of the plurality of SSBs among all the slots, and identify the degree of overlap by dividing the sub-number by the total number.

According to various example embodiments, at least part of identifying the sub-number corresponding to each of the plurality of SSBs among all the slots, the processor may be configured to identify each of PMI ranges corresponding respectively to the plurality of SSBs, identify at least one PMI associated with the at least one transmission signal for the downlink traffic, for each of all the slots, and identify each of the sub-numbers corresponding respectively to the plurality of SSBs, based on a PMI range to which each of the at least one PMI belongs among the PMI ranges, for each of all the slots.

According to various example embodiments, as at least part of identifying the sub-number corresponding to each of the plurality of SSBs among all the slots, the processor may be configured to identify a beamforming weight corresponding to the first UE, for each of all the slots, identify a PMI corresponding to each of the beamforming weights, identify each of PMI ranges corresponding respectively to the plurality of SSBs, and identify the sub-number corresponding to each of the plurality of SSBs, based on a PMI range to which each of the at least one PMI belongs among the PMI ranges, for each of all the slots.

According to various example embodiments, as at least part of identifying the sub-number corresponding to each of the plurality of SSBs among all the slots, the processor may be configured to identify a sub-number associated with physical resource blocks (PRBs) equal to or greater than a PRB threshold, corresponding to each of the plurality of SSBs.

According to various example embodiments, the processor may further be configured to control the RF device to provide the degree of overlap between each of the plurality of directions and the first direction to a radio access network (RAN) intelligent controller (RIC) via an E2 interface.

According to various example embodiments, a method of operating a network may include obtaining, from a first cell among a plurality of cells, information about reception strengths of a plurality of SSBs from at least some of the plurality of cells, measured by a first UE connected to the first cell, obtaining degrees of overlap between a first beamforming direction of a transmission signal for downlink traffic corresponding to a UE connected to each of the plurality of cells and a plurality of second beamforming directions of a plurality of SSBs from the cell, and determining at least one cell to perform a CoMP function for the first UE from among the plurality of cells, based on the information about the reception strengths and the degrees of overlap.

According to various example embodiments, each of the degrees of overlap may be a degree of overlap between a bore-sight angle of a beam corresponding to the transmission signal for the downlink traffic corresponding to the UE connected to each of the plurality of cells and an angle range of a horizontal beam corresponding to the plurality of SSBs.

According to various example embodiments, determining at least one cell to perform the CoMP function for the first UE from among the plurality of cells, based on the information about the reception strengths and the degrees of overlap may include identifying at least one first SSB corresponding to a reception strength equal to or greater than a reception strength threshold, based on the information about the reception strengths, identifying at least one second SSB with a degree of overlap equal to or greater than an overlap degree threshold among the at least one first SSB, based on the degrees of overlap, and identifying the at least one cell corresponding to the at least one second SSB.

According to various example embodiments, determining at least one cell to perform the CoMP function for the first UE from among the plurality of cells, based on the information about the reception strengths and the degrees of overlap may include identifying at least one third SSB corresponding to an average reception strength equal to or greater than a reception strength threshold, based on the information about the reception strengths, identifying at least one fourth SSB having a sum of degrees of overlap among the at least one third SSB, based on the degrees of overlap, and identifying the at least one cell corresponding to the at least one fourth SSB. The average reception strength may be an average of a reception strength corresponding to each of the at least one third SSB and a reception strength of an SSB around the third SSB, and the sum of the degrees of overlap may be a sum of a degree of overlap corresponding to each of the at least one third SSB and a degree of overlap corresponding to an SSB around the third SSB According to various example embodiments, the method may further include providing information about the at least one cell to perform the CoMP function to the first cell via an E2 interface.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the RIC 101). For example, a processor (e.g., the processor 120*a*) of the machine (e.g., the RIC 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiment, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of operating a network, comprising:
    transmitting, to a first user equipment (UE) connected to the network, at least one transmission signal for downlink traffic corresponding to the first UE based on a first direction;
    transmitting a plurality of synchronization signal blocks (SSBs) configured by the network, based on a plurality of directions corresponding respectively to the plurality of SSBs; and
    identifying a degree of overlap between each of the plurality of directions corresponding respectively to the plurality of SSBs and the first direction including:
        identifying a total number of all slots corresponding to the at least one transmission signal for the downlink traffic corresponding to the first UE, and
        identifying a first number of slots, among all the slots, where a first direction of the at least one transmission signal for downlink traffic and a plurality of directions corresponding respectively to the plurality of SSBs overlap each other.

2. The method of claim 1, wherein the degree of overlap between each of the plurality of directions and the first direction includes, a degree of overlap between a bore-sight angle of a beam corresponding to the at least one transmission signal for the downlink traffic corresponding to the first UE and an angle range of a horizontal beam corresponding to the plurality of SSBs.

3. The method of claim 1,
    further comprising identifying the degree of overlap by dividing the first number of slots by the total number.

4. The method of claim 1, wherein identifying the first number of slots comprises:
- identifying each of precoder matrix indicator (PMI) ranges corresponding respectively to the plurality of SSBs;
- identifying at least one PMI associated with the at least one transmission signal for the downlink traffic, for each of all the slots; and
- identifying each of the first numbers corresponding respectively to the plurality of SSBs, based on a PMI range to which each of the at least one PMI belongs among the PMI ranges, for each of all the slots.

5. The method of claim 4, wherein the at least one PMI associated with the at least one transmission signal for the downlink traffic is represented in dimensions of an oversampled discrete Fourier transform (DFT) beam, and
- wherein each of the PMI ranges corresponding respectively to the plurality of SSBs is represented in the dimensions of the oversampled DFT beam.

6. The method of claim 1, wherein identifying the first number of slots comprises:
- identifying a beamforming weight corresponding to the first UE, for each of all the slots;
- identifying a PMI corresponding to each of the beamforming weights;
- identifying each of PMI ranges corresponding respectively to the plurality of SSBs; and
- identifying the first number of slots corresponding to each of the plurality of SSBs, based on a PMI range to which each of the at least one PMI belongs among the PMI ranges, for each of all the slots.

7. The method of claim 1, wherein identifying the first number of slots comprises:
- identifying a second number associated with physical resource blocks (PRBs) equal to or greater than a PRB threshold, corresponding to each of the plurality of SSBs.

8. The method of claim 1, further comprising providing the degree of overlap between each of the plurality of directions and the first direction to a radio access network (RAN) intelligent controller (RIC) via an E2 interface.

9. A base station (BS) comprising:
- a radio frequency (RF) device comprising RF circuitry; and
- a processor including processing circuitry,
- memory storing instructions that, when executed by the at least one processor, cause the electronic device to:
- control the RF device to transmit, to the first user equipment (UE) connected to the BS, at least one transmission signal for downlink traffic corresponding to the first UE based on a first direction,
- control the RF device to transmit a plurality of synchronization signal blocks (SSBs) configured by the BS, based on a plurality of directions corresponding respectively to the plurality of SSBs, and
- identify a degree of overlap between each of the plurality of directions corresponding respectively to the plurality of SSBs and the first direction including:
  - identifying a total number of all slots corresponding to the at least one transmission signal for the downlink traffic corresponding to the first UE, and
  - identifying a first number of slots, among all the slots, where a first direction of the at least one transmission signal for downlink traffic and a plurality of directions corresponding respectively to the plurality of SSBs overlap each other.

10. The BS of claim 9, wherein the degree of overlap between each of the plurality of directions and the first direction includes a degree of overlap between a bore-sight angle of a beam corresponding to the at least one transmission signal for the downlink traffic corresponding to the first UE and an angle range of a horizontal beam corresponding to the plurality of SSBs.

11. The BS of claim 9, wherein the instructions cause the electronic device to
- identify the degree of overlap by dividing the first number of slots by the total number.

12. The BS of claim 9, wherein the instructions cause the electronic device to:
- identify each of precoder matrix indicator (PMI) ranges corresponding respectively to the plurality of SSBs,
- identify at least one PMI associated with the at least one transmission signal for the downlink traffic, for each of all the slots, and
- identify each of the first numbers corresponding respectively to the plurality of SSBs, based on a PMI range to which each of the at least one PMI belongs among the PMI ranges, for each of all the slots.

13. The BS of claim 9, wherein the instructions cause the electronic device to:
- identify a beamforming weight corresponding to the first UE, for each of all the slots,
- identify a PMI corresponding to each of the beamforming weights,
- identify each of PMI ranges corresponding respectively to the plurality of SSBs, and
- identify the first number of slots corresponding to each of the plurality of SSBs, based on a PMI range to which each of the at least one PMI belongs among the PMI ranges, for each of all the slots.

14. The BS of claim 9, wherein the instructions cause the electronic device to:
- identify a second number associated with physical resource blocks (PRBs) equal to or greater than a PRB threshold, corresponding to each of the plurality of SSBs.

15. The BS of claim 9, wherein the instructions cause the electronic device to:
- control the RF device to provide the degree of overlap between each of the plurality of directions and the first direction to a radio access network (RAN) intelligent controller (RIC) via an E2 interface.

* * * * *